(12) United States Patent
Nozaki

(10) Patent No.: US 8,170,314 B2
(45) Date of Patent: May 1, 2012

(54) IMAGE PROCESSING DEVICE AND IMAGE PROCESSING PROGRAM STORAGE MEDIUM

(75) Inventor: Tomoko Nozaki, Kawasaki (JP)

(73) Assignee: FUJIFILM Corporation, Tokyo (JP)

( * ) Notice: Subject to any disclaimer, the term of this patent is extended or adjusted under 35 U.S.C. 154(b) by 996 days.

(21) Appl. No.: 12/135,345

(22) Filed: Jun. 9, 2008

(65) Prior Publication Data
US 2008/0310694 A1    Dec. 18, 2008

(30) Foreign Application Priority Data
Jun. 13, 2007    (JP) .................. 2007-156667

(51) Int. Cl.
G06K 9/78    (2006.01)
(52) U.S. Cl. ...................... 382/130; 382/128
(58) Field of Classification Search .............. None
See application file for complete search history.

(56) References Cited

U.S. PATENT DOCUMENTS
2002/0114425 A1* 8/2002 Lang et al. ............... 378/56
2006/0269115 A1* 11/2006 Oosawa ................... 382/132

FOREIGN PATENT DOCUMENTS
JP    2002-032735 A    1/2002
JP    2002-032764 A    1/2002
JP    2003-244542 A    8/2003

* cited by examiner

Primary Examiner — Jason M Repko
Assistant Examiner — Thomas A James
(74) Attorney, Agent, or Firm — Sughrue Mion, PLLC

(57) ABSTRACT

An image processing device has: an image acquisition section that acquires a plurality of photographic images obtained by photographing the same subject at different photography times; and a part identification section that identifies a portion where a predetermined part among parts that form the subject in the photographic images appears. The device further has: a first processing section that applies first matching processing, which matches two images by transforming one or both of the two images, to two of the plurality of photographic images; and a second processing section that applies second matching processing, which matches two images by transforming one or both of the two images and whose application range of the amount of transformation required for matching is different from that of the first matching processing, to the portion identified by the part identification section in the two of the plurality of photographic images.

6 Claims, 19 Drawing Sheets

IMAGE PROCESSING DEVICE AND IMAGE PROCESSING PROGRAM STORAGE MEDIUM

BACKGROUND OF THE INVENTION

1. Field of the Invention

The present invention relates to an image processing device that executes image processing for matching two images, and an image processing program storage medium that stores an image processing program for causing a computer to operate as the image processing device.

2. Description of the Related Art

In the medical field, medical images obtained by photographing the body of a subject by means of X-ray and the like are widely used for diagnosing the condition of the subject. Use of medical images for diagnosis makes it possible to grasp the development of the condition of a subject without giving external damages to the subject, and to readily obtain the information required to decide a treatment plan.

Also, in recent years, there have been widely used devices such as Computed Radiography (CR) device that obtains digital medical images by using X-ray, and Computerized Tomography (CT) device that obtains a tomogram image of a subject by using X-ray, and Magnetic Resonance Imaging (MRI) device that obtains a tomogram image of a subject by using high magnetic field. Accordingly, instead of conventional medical images using X-ray films, digital medical images are generally used.

Because medical images are digitized, it is possible to apply image processing to medical images, thereby performing diagnosis more effectively than conventional ways. As one of such image processing to be applied to medical images, attention has been focused on image processing called Energy Subtraction (ES) processing in recent years. In the ES processing, from a pixel value in one of two images photographed by using two kinds of X-rays having different energies, a pixel value in the other is subtracted after being assigned a certain weight, so that among body parts forming the body structure of a subject in the former medical image, an image of a body part having a certain absorption property with respect to X-rays can be erased. According to the ES processing, it is possible to obtain a soft-part image formed only by soft-tissue images by erasing bone images from a medial image, and on the contrary, to obtain a bone-part image formed only by bone images by erasing soft-tissue images from a medial image. As a result, a focus hidden by a bone, a focus within a bone, or the like can be readily discovered and thus effective diagnosis can be performed.

Here, it is desirable that two medical images match each other so that the ES processing is performed with high accuracy. In late years, it is widely adopted photography using the so-called flat panel detector (FPD) in the field of X-ray photography, in which X-ray detecting elements are two dimensionally arrayed. In this type of detector however, a single medical image is obtained by single photography and thus, the photography times of two medical images are different. Therefore, it is very likely that two medical images disagree due to the attitude or respiration of a subject at each photography time. If the ES processing is forcibly applied to two medical images that are disagree, a virtual image (artifact) that did not originally exist appears in a displacement between the two medical images, which obstructs the reading of the images.

In this regard, there is proposed a technique for applying image processing to two medical images to be subjected to the ES processing and the like, such that one of the these two images is transformed to agree with the other (see, for example, Japanese Patent Application Publication No. 2002-32735, No. 2002-32764 and No. 2003-244542).

Incidentally, as one of representative medical images, there is a chest image obtained by photographing a chest part of a subject. The chest image shows a heart whose shape changes by heartbeat. The movement of a heart is different from those of other elements such as lungs, blood vessels and bones in terms of direction, amount or the like of movement. As a result, there are cases in which even if, for example, image processing disclosed by any of the above-mentioned patent application publications is applied to two chest images, a displacement remains in a heart portion or the periphery thereof and thus an artifact occurs after the ES processing.

SUMMARY OF THE INVENTION

The present invention has been made in view of the above circumstances and provides an image processing device capable of matching two images with high accuracy and an image processing program storage medium that stores an image processing program for causing a computer to operate as the image processing device.

An image processing device according to the present invention includes:

an image acquisition section that acquires a plurality of photographic images obtained by photographing the same subject at different photography times;

a part identification section that identifies a portion where a predetermined part among parts that form the subject in the photographic images appears;

a first processing section that applies first matching processing, which matches two images by transforming one or both of the two images, to two of the plurality of photographic images; and a second processing section that applies second matching processing, which matches two images by transforming one or both of the two images and whose application range of the amount of transformation required for matching is different from that of the first matching processing, to the portion identified by the part identification section in the two of the plurality of photographic images.

According to the image processing device of the present invention, the second matching processing is applied to a portion identified by the part identification section. Thus, for example, a portion (such as a heart in a chest image) whose movement is greatly different from other portions in the photographic image is identified by the part identification section and then, matching processing appropriate to the way of movement of the identified portion is applied as the second matching processing to the identified portion by the second processing section, so that a displacement of the identified portion can be effectively canceled. According to the image processing device of the present invention, it is possible to match two photographic images with high accuracy by combining the second matching processing that is the matching processing for an identified portion and the first matching processing that is the matching processing for the entire image.

Here, in the image processing device according to the present invention, it is preferable that the part identification section identifies a portion where an edge of the predetermined part appears, and the second processing section applies the second matching processing to the portion, thereby transforming the portion in a direction intersecting the edge.

For example, a displacement in a heart portion in two chest images occurs due to heartbeat in the direction intersecting an edge of the heart. According to the image processing device with the above additional feature, because the portion in the photographic image is transformed in the direction intersecting the edge, displacements and the like in the heart portion can be canceled effectively as well as efficiently.

In the image processing device according to the present invention, it is also preferable that the first processing section applies the first matching processing to portions in the two photographic images other than the portion identified by the part identification section.

According to the image processing device with this additional feature, because the portion where a displacement is to be canceled by the second matching processing is not affected by the transformation performed by the first matching processing, two photographic images can be matched with higher accuracy.

In the image processing device according to the present invention, it is also preferable that "the first processing section and the second processing section perform the first matching processing and the second matching processing concurrently,"

"the second processing section applies the second matching processing to photographic images after the first matching processing is applied to the two photographic images by the first processing section," or "the second processing section applies the second matching processing to photographic images before the first matching processing is applied to the two photographic images by the first processing section."

According to any of these additional features, the overall displacement and the displacement of a portion identified by the part identification section in two photographic images can be canceled in the order of the former first and the latter next, in the inverse order of the latter first and the former next, or concurrently.

An image processing program storage medium of the present invention stores an image processing program that is incorporated and implements in a computer:

an image acquisition section that acquires a plurality of photographic images obtained by photographing the same subject at different photography times;

a part identification section that identifies a portion where a predetermined part among parts that form the subject in the photographic images appears;

a first processing section that applies first matching processing, which matches two images by transforming one or both of the two images, to two of the plurality of photographic images; and a second processing section that applies second matching processing, which matches two images by transforming one or both of the two images and whose application range of the amount of transformation required for matching is different from that of the first matching processing, to the portion identified by the part identification section in the two of the plurality of photographic images.

According to the image processing program storage medium of the present invention, an image processing device that matches two image with high accuracy can be readily realized.

Note that only the basic feature of the image processing program storage medium of the present invention has been described above only for the purpose of avoiding redundant description. The image processing program storage medium of the present invention includes features corresponding to the various additional features of the previously described image processing device.

Further, each element such as the image acquisition section and the like implemented in the computer by the image processing program may be configured by a single program component or plural program components. Alternatively, each of these elements may execute the operation itself or by giving orders to other program or program components incorporated in a computer.

As described above, according to the present invention, it is possible to obtain an image processing device capable of matching two images with high accuracy and an image processing program storage medium that stores an image processing program for causing a computer to operate as the image processing device.

DETAILED DESCRIPTION OF THE INVENTION

Embodiments of the present invention will be described with reference to the drawings.

Figure 1:
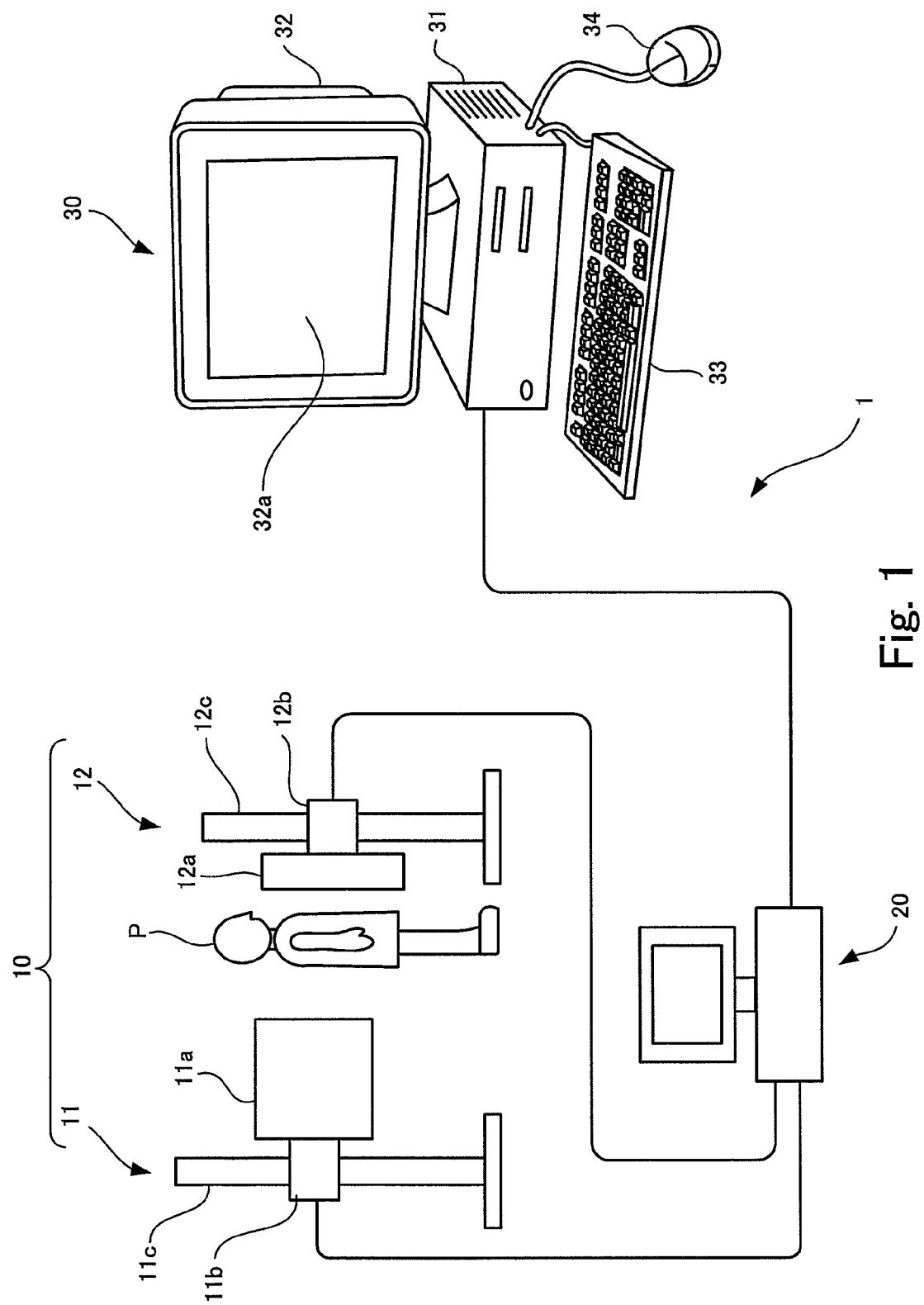
FIG. 1 is a schematic block-diagram of a medical image acquisition system to which the first through the third embodiments of the present invention are applied.

FIG. 1 is a schematic block-diagram of a medical image acquisition system to which the first through the third embodiments of the present invention are applied.

A medical image acquisition system 1 shown in FIG. 1 includes: an image generation system 10 that generates a medical image by photographing the body of a subject; a system controlling device 20 that controls the image generation system 10; and a medical-image display device 30 that displays a medical image. The system controlling device 20 and the medical-image display device 30 are connected through a network.

The image generation system 10 includes an X-ray irradiation device 11 that irradiates X-rays and a detection device 12 that carries out photography by detecting X-rays passing through the body of a subject P thereby obtaining a medical image.

The X-ray irradiation device 11 is provided with a housing section 11a that houses a bulb for emitting X-rays, a moving section 11b that moves the housing section 11a up and down, and a support section 11c that supports the housing section 11a and the moving section 11b.

Also, the detection device 12 is a standing type of device in which a flat panel detector (FPD) 12a is mounted. The detection device 12 is provided with, in addition to the FPD 12a, a moving section 12b that moves the FPD 12a up and down, and a support section 12c that supports the FPD 12a and the moving section 12b.

In the image generation system 10, the subject P faces the FPD 12a while standing between the X-ray irradiation device 11 and the FPD 12a.

When the positions of the housing section 11a and the FPD 12a according to a photographed part of the subject P are input by a user, the system controlling device 20 transmits, to each of the moving section 11b of the X-ray irradiation device 11 and the moving section 12b of the detection device 12, an instruction signal for arranging the housing section 11a and the FPD 12a according to the positions input by the user. As a result, the housing section 11a and the FPD 12a according to the part to be photographed of the subject P are placed at the positions input by a user.

Subsequently, photography conditions are input by the user to the system controlling device 20. The photography conditions include: a photography mode selected as either one of two kinds of photography modes, single photography and continuous photography (used for ES processing described later), energy of X-ray to be emitted at the time of photography, and the like. Also, when the continuous photography is selected as the photography mode, a photography interval between shootings, energy of X-ray, and the like are input as the photography conditions for the continuous photography. The input photography conditions are set by the system controlling device 20, to circuits such as a control circuit for the bulb emitting X-rays and housed in the housing section 11a of the X-ray irradiation device 11 and a control circuit for photography in the FPD 12a of the detection device 12.

Subsequently, when the user orders photography by operating the system controlling device 20, the system controlling device 20 transmits predetermined trigger signals synchronized with each other to both of the X-ray irradiation device 11 and the detection device 12. When the trigger signal is received by the housing section 11a of the X-ray irradiation device 11, the bulb emits X-ray of the energy in the photography condition, and when the trigger signal is received by the FPD 12a of the detection device 12, X-ray detection is performed. The X-rays passing through the body of the subject P is detected by the FPD 12a and photography is performed. Accordingly, a digital image representing the inside of the body of the subject P is obtained by the image generation system 10.

Also, in the case when the continuous photography is designated as a photography mode by the user, in response to receipt of a single transmission of a trigger signal from the system controlling device 20, photography is performed twice based on a photography interval according to the photography condition by using X-ray of the energy based on each photography condition. By this continuous photography, two medical images are obtained by using two kinds of X-rays of different energies.

The medical image obtained by the photography is sent to the system controlling device 20 from the image generation system 10, and displayed on a predetermined monitor in the system controlling device 20. Also, management information such as the identification number to identify the subject P, the photography date and the photography time is input into the system controlling device 20 by an operation of the user. In the system controlling device 20, the management information and the photography conditions used by the photography are attached to the medical image sent from the image generation system 10. Further, as for the two medical images obtained by the continuous photography, the management information and the photography conditions are attached to and associated with each of the images. Subsequently, the system controlling device 20 sends the medical image, to which the management information and the photography conditions have been attached, to the medical-image display device 30 through the network.

The medical-image display device 30 includes: a main unit 31, image display unit 32 which displays an image on a display screen 32a according to an instruction sent from the main unit 31, a keyboard 33 used for inputting various information according to key operations into the main unit 31, and a mouse 34 used for inputting an instruction according to an icon or the like display at an arbitrary position on the display screen 32a by designating the position, in terms of external appearance configuration.

In the medical-image display device 30, when the identification number and the like of the subject are input by the user by operating the medical-image display device 30, a medical image according to the input identification number and the like is displayed on the display screen 32a. The user can diagnose the condition of the subject by looking at the medical image and the like displayed on the display screen 32a of the medical-image display device 30, without applying external damages to the subject.

The medical image acquisition system 1 shown in FIG. 1 is basically configured as described above.

Here, the feature of the medical image acquisition system 1 lies in the processing contents performed by the medical-image display device 30. Therefore, the medical-image display device 30 will be described in detail below.

Figure 2:
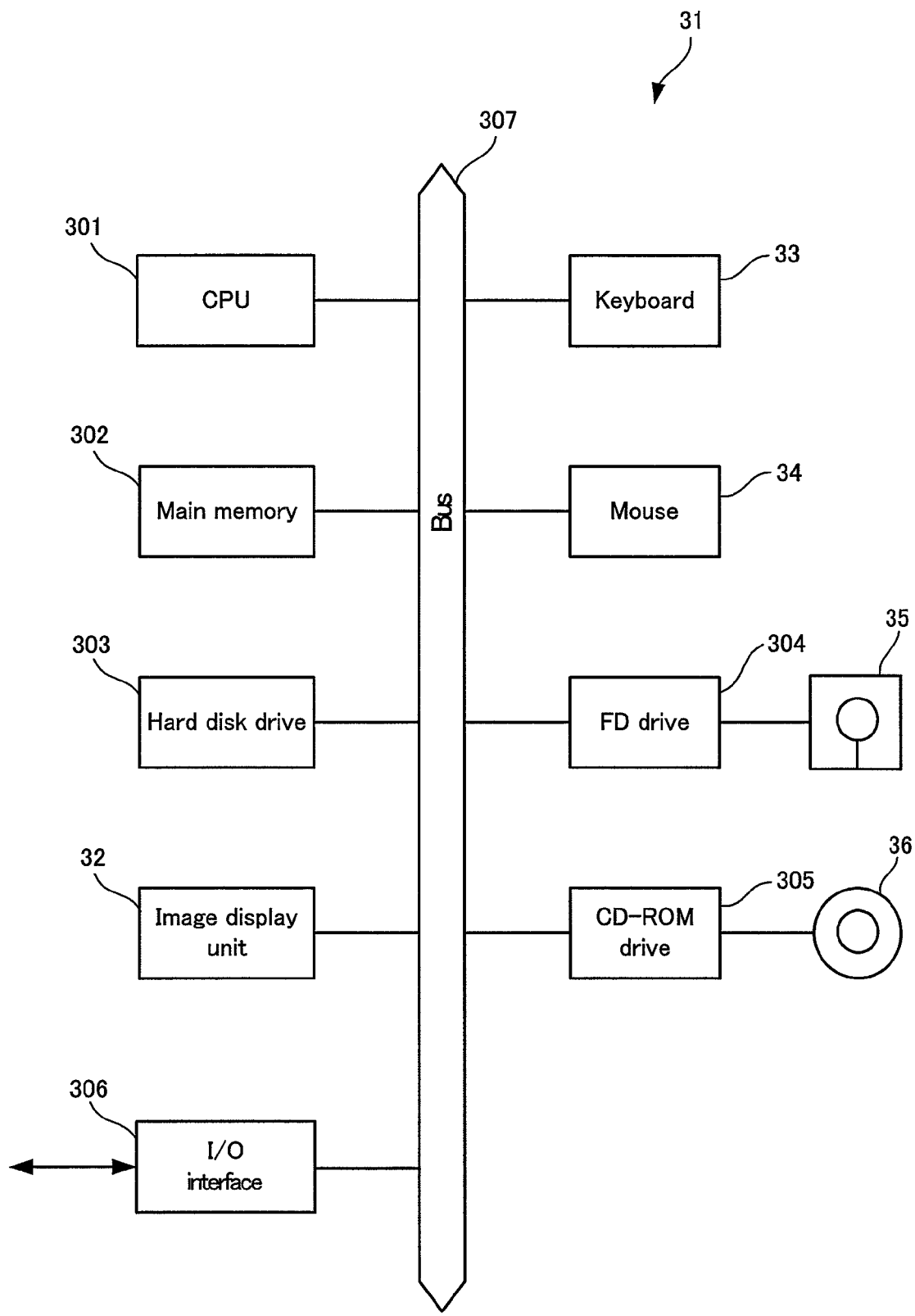
FIG. 2 is a hardware block-diagram of a medical-image display device 30.

FIG. 2 is a hardware block-diagram of the medical-image display device 30.

As shown in FIG. 2, the main unit 31 of the medical-image display device 30 includes: a CPU 301 that executes various programs; a main memory 302 to which a program stored in a hard disk drive 303 is read and developed to be executed by the CPU 301; the hard disk drive 303 in which various programs, data and the like are stored; an FD drive 304 that accesses an FD 35 inserted therein; a CD-ROM drive 305 that accesses a CD-ROM 36 inserted therein; and an I/O interface 306 to exchange various information such as medical images with the system controlling device 20. These elements as well as the image display unit 32, the keyboard 33 and the mouse 34 shown in FIG. 1 are interconnected by a bus 307.

Here, the medical-image display device 30 has the function of operating as a ES processing device that performs the so-called Energy Subtraction (ES) processing. In this ES processing, from a pixel value in one of the two medical images obtained by using two kinds of X-rays of different energies in the continuous photography, a pixel value in the other is subtracted after being assigned a predetermined weight. Accordingly, an image, which represents a body part of the body structure of the subject shown in the former image and has a certain absorption property with respect to X-rays, is erased.

It is desirable that two medical images match each other so that the ES processing is performed with high accuracy. However, the photography times of these two medical images are different and thus, in some cases, two medical images do not match each other due to the attitude or respiration of the subject at each photography time. If the ES processing is forcibly applied to two medical images when they do not match, a virtual image (artifact) that did not originally exist appears in a displacement between the two medical images, which obstructs the image reading.

Therefore, the medical-image display device 30 has the function of operating as an image processing device that applies image processing to two medical images to be subjected to the ES processing such that one of the two images is transformed to agree with the other.

Figure 3:
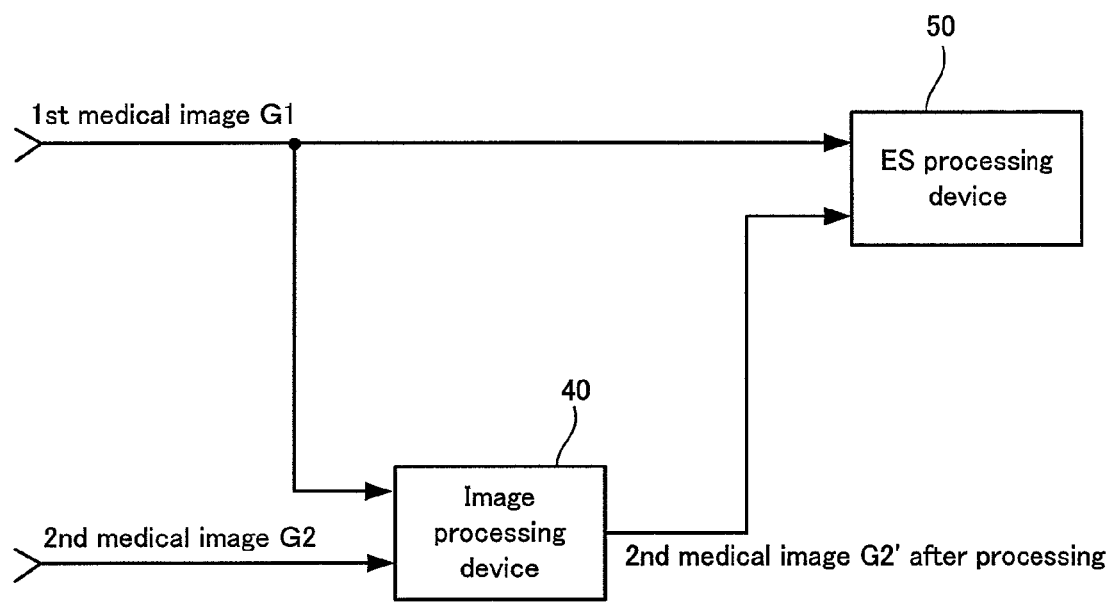
FIG. 3 is a block diagram showing the relationship between an ES processing device that performs ES processing and an image processing device that performs image processing for the ES processing.

FIG. 3 is a block diagram showing the relationship between the ES processing device that performs ES processing and the image processing device that performs image processing for the ES processing.

Based on a first medical image G1 and a second medical image G2 obtained in continuous photography by the image generation system 10 shown in FIG. 1, the ES processing is executed. Here, the first medical image G1 is directly input into the ES processing device 50. On the other hand, the second medical image G2 is first subjected to image processing for making it agree with the first medical image G1 in the image processing device 40 and then input into the ES processing device 50. The image processing executed by the image processing device 40 will be described later. Here, the ES processing will be described first.

Figure 4:
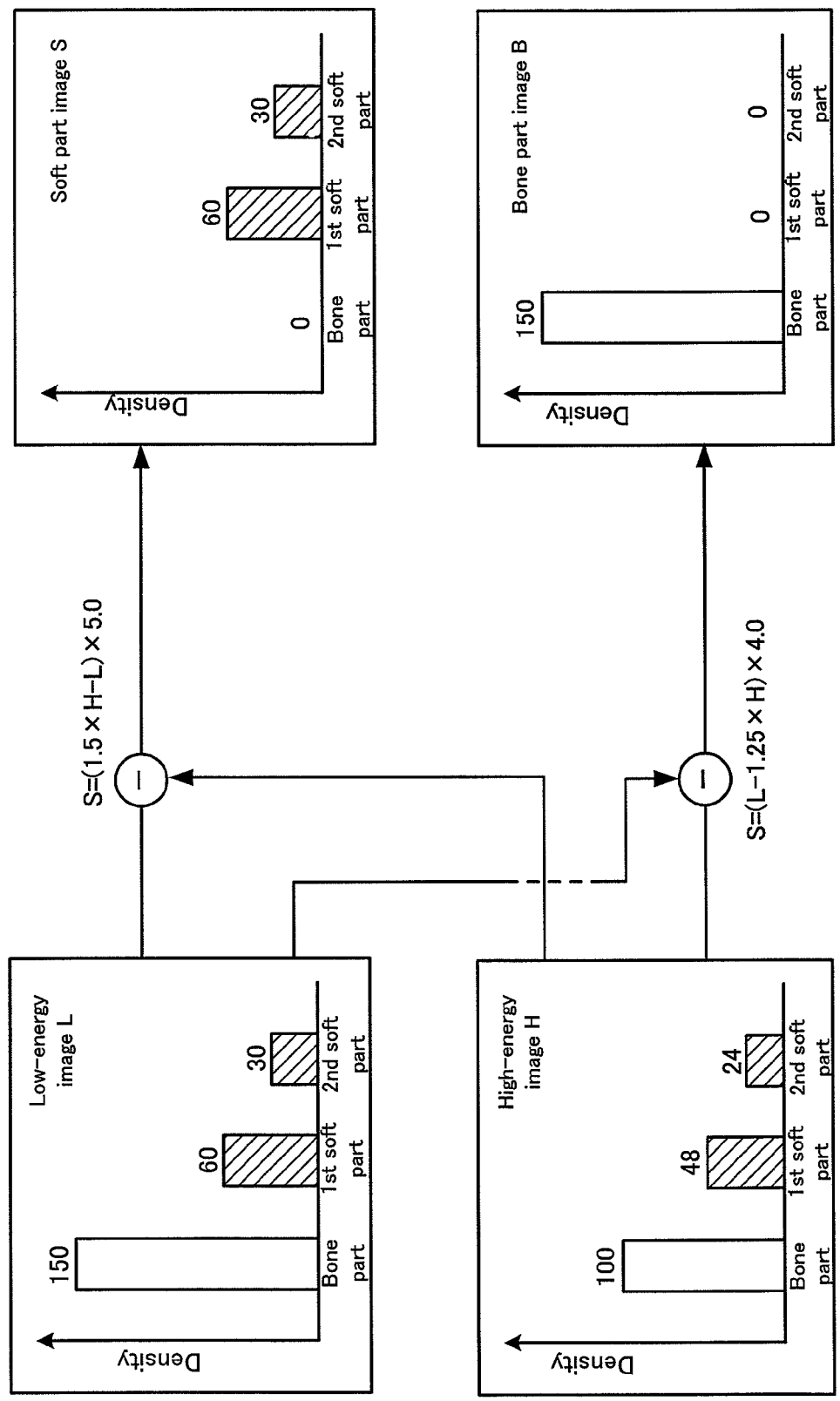
FIG. 4 is an explanatory drawing of ES processing.

FIG. 4 is an explanatory drawing of the ES processing.

As described earlier, the two medical images used in the ES processing are images obtained by using two kinds of X-rays of different energies in continuous photography. FIG. 4 schematically shows, by using a low-energy image L obtained by the photography using relatively low energy X-rays and a high-energy image H obtained by the photography using relatively high energy X-rays, the principle of the ES processing for erasing an image of a target body part from the low-energy image L.

Here, in a medical image obtained by the image generation system 10 (see FIG. 1) that obtains an image of the inside of the subject by detecting X-rays passing through the body, parts receiving a large amount of passing X-rays appear dark whereas parts receiving a small amount of passing X-rays appear pale. In such a medical image, bone parts in the body of the subject receive a small amount of passing X-rays and thus appear pale because X-ray transmission is disturbed by bones. On the other hand, soft parts such as muscular tissue receive a larger amount of passing X-rays than the bone parts appear darker. Further, because the amounts of X-rays passing through the soft parts vary depending on the type of tissue, the densities of the respective soft parts vary depending on the type of tissue as well.

Also, X-rays have such a characteristic that the higher the energy is, the stronger the penetrating power is. Therefore, the higher the energy of X-rays in use is, the smaller the effect of obstruction by bones on X-ray transmission is. Therefore, the high-energy image H and the low-energy image L are different in proportion (contrast) between bone parts and soft parts. In the ES processing, elimination of soft parts or bone parts is performed by using such a difference in contrast between these two kinds of images.

As described earlier, in the ES processing of the example shown FIG. 4, an image of a desired body part is erased from the low-energy image L. FIG. 4 shows: an example in which a soft part image S obtained by erasing bone parts from a low-energy image L thereby leaving only soft parts is created; and another example in which a bone part image B obtained by erasing soft parts from a low-energy image L thereby leaving only bone parts is created.

In the example in which the soft part image S is created, first, the densities in bone part of the two medical images are combined and a difference therebetween is calculated. As a result, an image which has "zero" as the density of bone part, i.e. an image from which bone parts are erased, is obtained. Even if bone parts are erased, since the high-energy image H and the low-energy image L are different in terms of contrast between soft parts and bone parts, soft parts remain. Subsequently, the result of difference in terms of the density in soft part is multiplied by a coefficient for matching the value of the difference with the density in soft part of the low-energy image L. As a result, a soft part image S based on the low-energy image L from which bone parts are erased and in which only soft parts are shown is obtained.

On the other hand, in the example in which the bone part image B is created, the densities in soft part of the two medical images are combined and a difference therebetween is calculated. As a result, an image which has "zero" as the density of soft part, i.e. from which soft parts are erased is obtained. Subsequently, the result of difference in terms of the density in bone part is multiplied by a coefficient for matching the value of the difference with the density in bone part of the low-energy image L. As a result, a bone part image B based on the low-energy image L from which soft parts are erased and in which only bone parts are shown is obtained. As described above, in the ES processing, calculation of the difference between the two medical images is carried out to erase an image of a desired body part. Therefore, when, for example, images of bone parts are erased, if two medical images are different in terms of the position of bone part, the density in a displacement formed by the positional difference does not become "zero" and thus, a virtual image (artifact) which did not originally exist appears. For this reason, in order to perform the ES processing with high precision, the two medical images also need to match each other with high accuracy. As described earlier, in the medical-image display device 30 of the medical image acquisition system 1 shown in FIG. 1, matching of two medical images to be subjected to the ES processing is realized by the image processing device 40 shown in FIG. 4. The image processing device 40 will be now described in detail.

As the image processing device 40, an image processing device of either one of three types (described later) is employed. Also, the image processing device of each type is implemented by the medical-image display device 30 when the medical-image display device 30 shown in FIG. 1 operates according to an image processing program according to each type of image processing device. The image processing program is stored in the CD-ROM 36 shown in FIG. 2, and supplied to the medical-image display device 30 through the CD-ROM 36.

Note that, the CD-ROM 36 is illustrated as an example of a storage medium that stores the image processing program, but the storage medium that stores the image processing program is not limited to CD-ROM and may be other types of storage media such as optical disk, MO, FD, magnetic tape, etc. Also, the image processing program may be directly supplied to the medical-image display device 30 through the I/O interface 306 without using a storage medium.

At first, an image processing device of the first type will be described.

The image processing device of the first type is the first embodiment of the present invention and built in the medical-image display device 30 when the medical-image display device 30 shown in FIG. 1 operates according to the image processing program of the first type, which will be described below. The image processing program of the first type is supplied to the medical-image display device 30 through the CD-ROM 36 shown in FIG. 2 that is an embodiment of the image processing program storage medium of the present invention.

Figure 5:
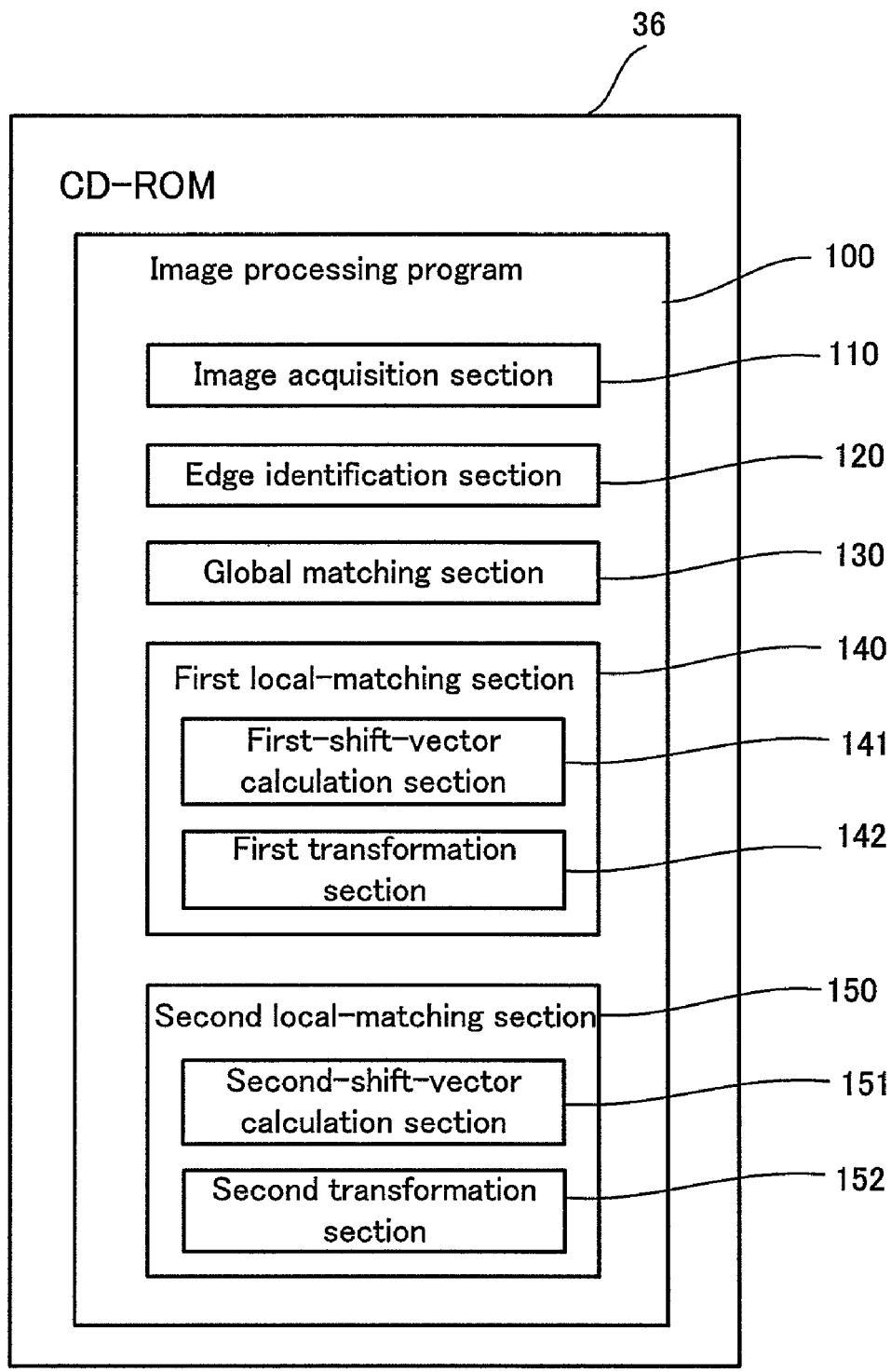
FIG. 5 is a conceptual diagram showing a CD-ROM 36 where an image processing program of the first type is stored.

FIG. 5 is a conceptual diagram showing the CD-ROM 36 where the image processing program of the first type is stored.

As shown in FIG. 5, an image processing program 100 of the first type stored in the CD-ROM 36 is composed of: an image acquisition section 110, an edge identification section 120, a global matching section 130, a first local-matching section 140 and a second local matching section 150. Further, the first local-matching section 140 is composed of a first-shift-vector calculation section 141 and a first transformation section 142, and the second local matching section 150 is composed of a second-shift-vector calculation section 151 and a second transformation section 152.

Each section of the image processing program 100 of the first type will be described in detail together with the operation of each section of the image processing device of the first type.

Figure 6:
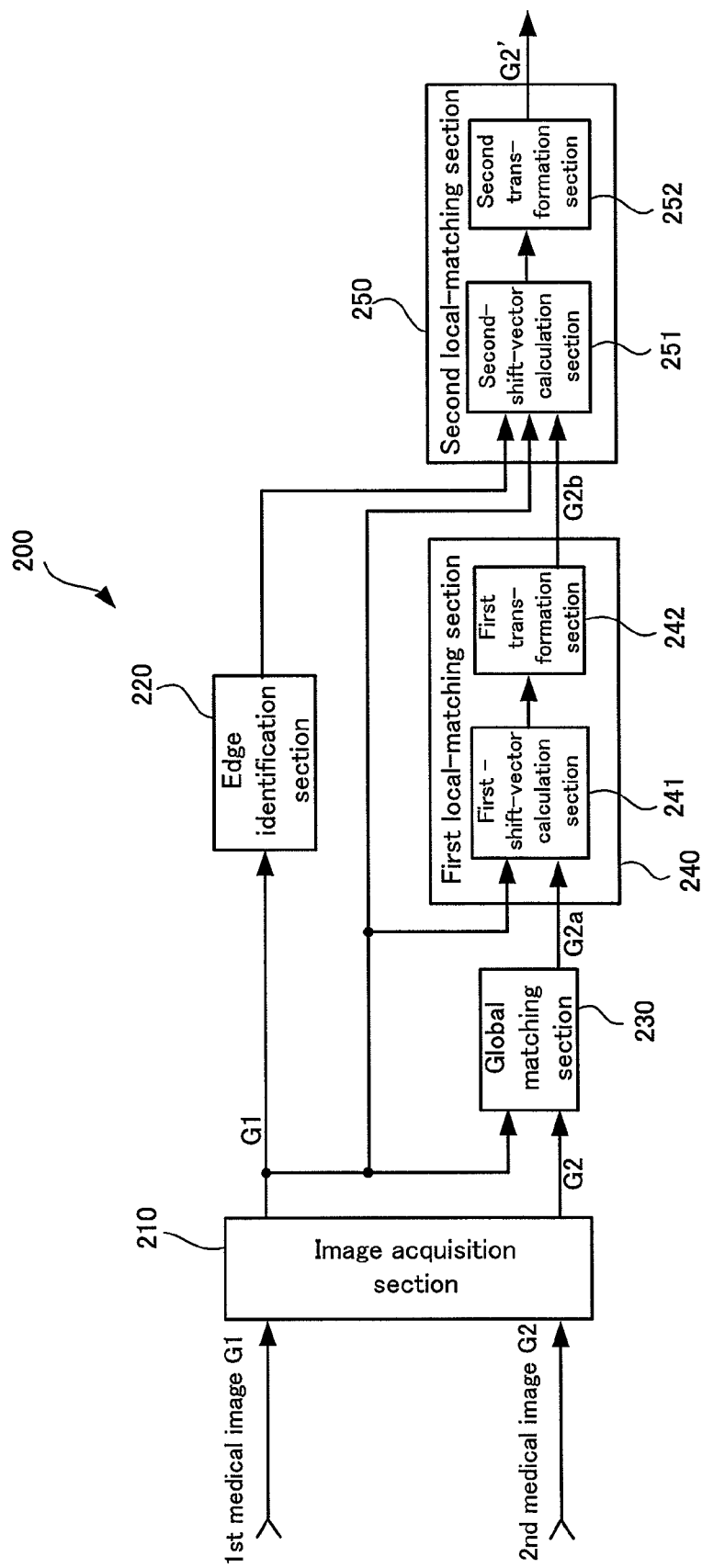
FIG. 6 is a functional block diagram of an image processing device of the first type.

FIG. 6 is a functional block diagram of the image processing device of the first type.

An image processing device 200 of the first type includes: an image acquisition section 210, an edge identification section 220, a global matching section 230, a first local-matching section 240, and a second local matching section 250. Further the first local-matching section 240 shown in FIG. 6 includes a first-shift-vector calculation section 241 and a first transformation section 242, and the second local matching section 250 shown in FIG. 6 includes a second-shift-vector calculation section 251 and a second transformation section 252.

Here, the image acquisition section 210, the edge identification section 220, the first local-matching section 240 and the second local matching section 250 shown in FIG. 6 are examples of the image acquisition section, the part identification section, the first processing section and the second processing section according to the present invention, respectively.

Also, the image acquisition section 210, the edge identification section 220, the global matching section 230, the first local-matching section 240, and the second local matching section 250 of the image processing device 200 of the first type shown in FIG. 6 correspond to the image acquisition section 110, the edge identification section 120, the global matching section 130, the first local-matching section 140, and the second local matching section 150 of the image processing program 100 of the first type shown in FIG. 5, respectively.

Furthermore, elements shown in FIG. 5 and elements shown in FIG. 6 are different in that each element shown in FIG. 6 is configured by the combination of the hardware of a computer and an OS or an application program executed in the computer, whereas each element of the image processing program 100 of the first type shown in FIG. 5 is configured only by the application program.

Figure 7:
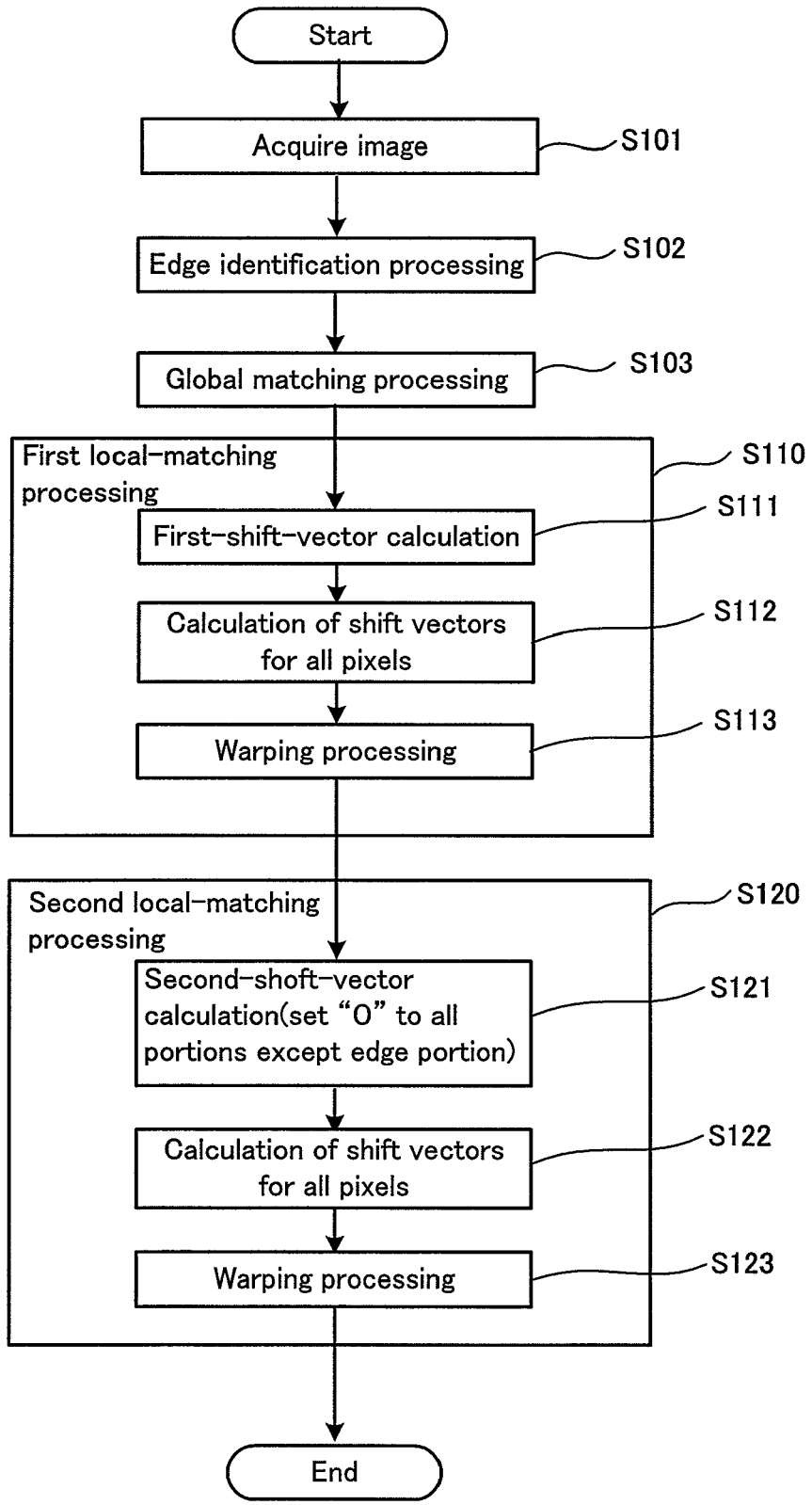
FIG. 7 is a flowchart showing the flow of a series of processing for causing, when two medical images are obtained in the image processing device 200 of the first type shown in FIG. 5, a second medical image G2 that is one of the obtained images to agree with a first medical image G1 that is the other.

FIG. 7 is a flowchart showing the flow of a series of processing for causing, when two medical images are obtained in the image processing device 200 of the first type shown in FIG. 5, a second medical image G2 that is one of the obtained images to agree with a first medical image G1 that is the other.

According to the flowchart shown in FIG. 7, each element of the image processing device 200 of the first type shown in FIG. 6 will be described, which will also serve as the description of each of elements forming the image processing program 100 of the first type shown in FIG. 5. Note that each element shown in FIG. 6 will be described without indicating figure numbers.

When two medical images G1, G2 to be subjected to ES processing are designated and then the execution of the ES processing is instructed by a user through predetermined user operations on the medical-image display device 30 shown in FIG. 1, the image processing shown in the flowchart of FIG. 7 starts as preparation processing for the ES processing before the ES processing begins.

When the processing starts, first, the image acquisition section 210 reads the two medical images G1, G2 designated by the user from a predetermined memory (step S101).

Here, the two medical images G1, G2 are images obtained in continuous photography; an image obtained by the first shooting is used as a first medical image G1, and an image obtained by the second shooting is used as a second medical image G2. In the image processing shown in the flowchart of FIG. 7, the second medical image G2 is transformed to agree with the first medical image G1.

The image acquisition section 210 sends the first medical image G1 of the obtained first and second medical images G1, G2 to the edge identification section 220, the global matching section 230, the first local-matching section 240, and the second local matching section 250, and also sends the second medical image G2 to the global matching section 230.

The edge identification section 220 applies edge identification processing to the first medical image G1 (step S102) as described below.

The edge identification section 220 identifies, in the first medical image G1, a portion that shows an edge of the body part designated by the user in the medical-image display device 30 shown in FIG. 1.

The user designates a body part on a designation screen displayed by the edge identification section 220 on the display screen 32a of the medical-image display device 30. On the designation screen, candidates for designation such as heart, stomach and liver are enumerated. On the designation screen, the user can designate a body part by selecting the name of a desired body part from among the listed candidates by operating the keyboard or the like.

In the following, for the sake of simplicity, the two medical images G1, G2 will be described as chest images assuming that the user has designated a heart and a diaphragm.

Figure 8:
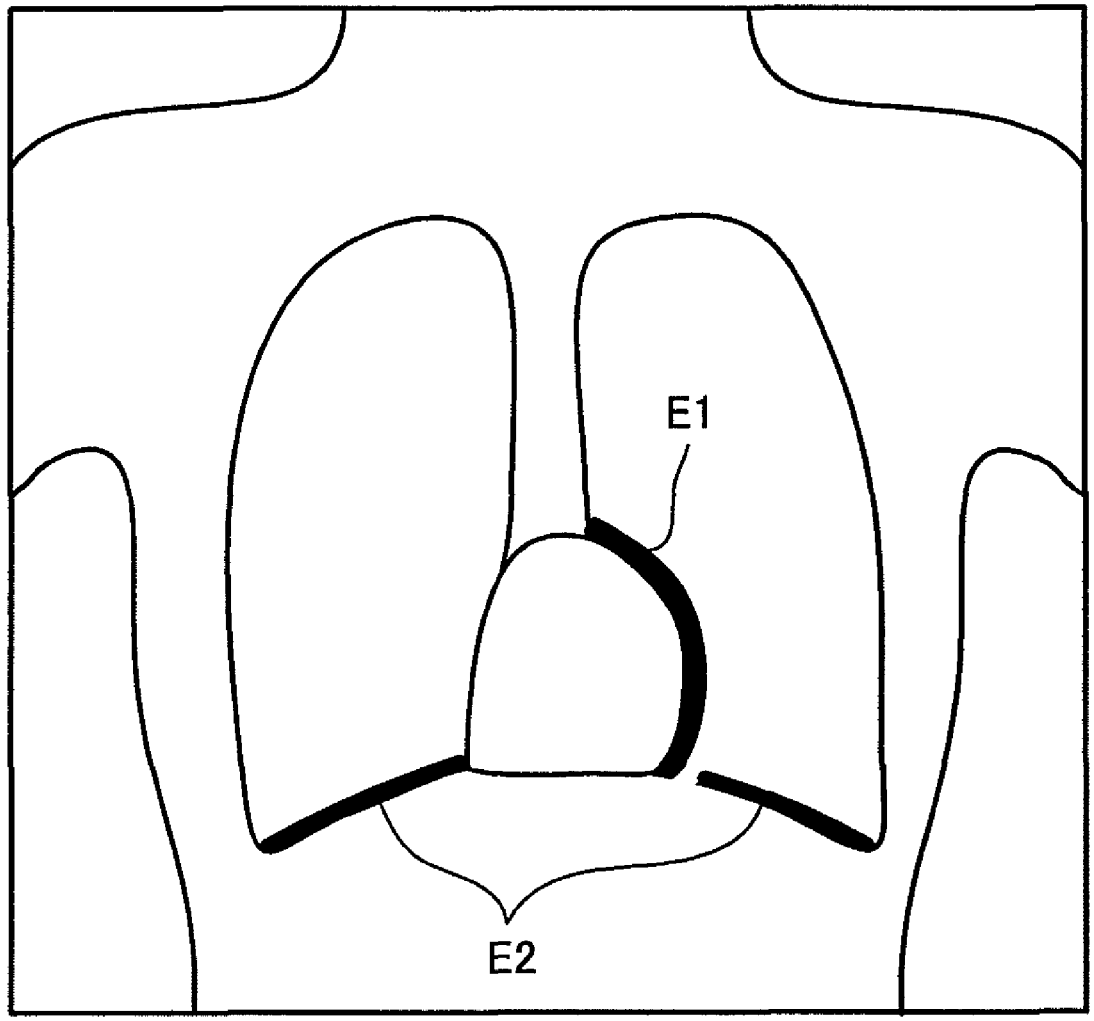
FIG. 8 is a typical illustration showing a medical image obtained by photographing a chest.

FIG. 8 is a typical illustration showing a medical image obtained by photographing a chest.

When a heart and a diaphragm are designated by the user, the edge identification section 220 identifies portions showing the following three edges that move in a manner different from other portions in the image due to heartbeat and respiration: a portion where a heart edge E1 is shown as a border between the heart and the lung on the right side in FIG. 8; and two portions where phrenic edges E2 are shown as borders between the right and left lungs and lower internal organs.

In this edge identification processing, at first, edge emphasizing processing is applied to the first medical image G1. Subsequently, positional information, which represents the positions of portions where the heart edge E1 and the phrenic edges E2 are anatomically very likely to appear, is read out from a predetermined memory where such information is stored. After that, in the first medical image G1 where edges are emphasized, edges closest to the positions represented by the positional information are searched for and the portions where the heart edge E1 and the phrenic edges E2 appear are found through the search. The found portions are sent to the second local matching section 250.

In the flowchart shown in FIG. 7, subsequently, the global matching processing, which makes the second medical image G2 schematically agree with the first medical image G1 by relatively inclining or moving the second medical image G2 with respect to the first medical image G1, is executed by the global matching section 230 (step S103). In this way, the schematic alignment of the second medical image G2 to the first medical image G1 is performed by the global matching processing, so that displacements and the like such as attitudinal fluctuations of the subject between the first shooting and the second shooting in the continuous photography, which uniformly appear on the entire image, are schematically canceled. When this global matching processing is completed, the first second medical image G2a whose schematic alignment is completed after the global matching processing is sent to the local matching section 240.

Subsequently, the first local-matching section 240 applies the first local-matching processing for matching the second medical image G2a after schematic alignment with the first medical image G1 by transforming the entire second medical image G2a (step S110). The first local-matching processing is an example of the first matching processing according to the present invention, which is directed to resolution of local displacements that cannot be canceled in the uniform matching processing by the global matching processing.

In the first local-matching processing, the first shift vector (described later) is calculated by the first-shift-vector calculation section 241 of the first local-matching section 240 (step S111).

Figure 9:
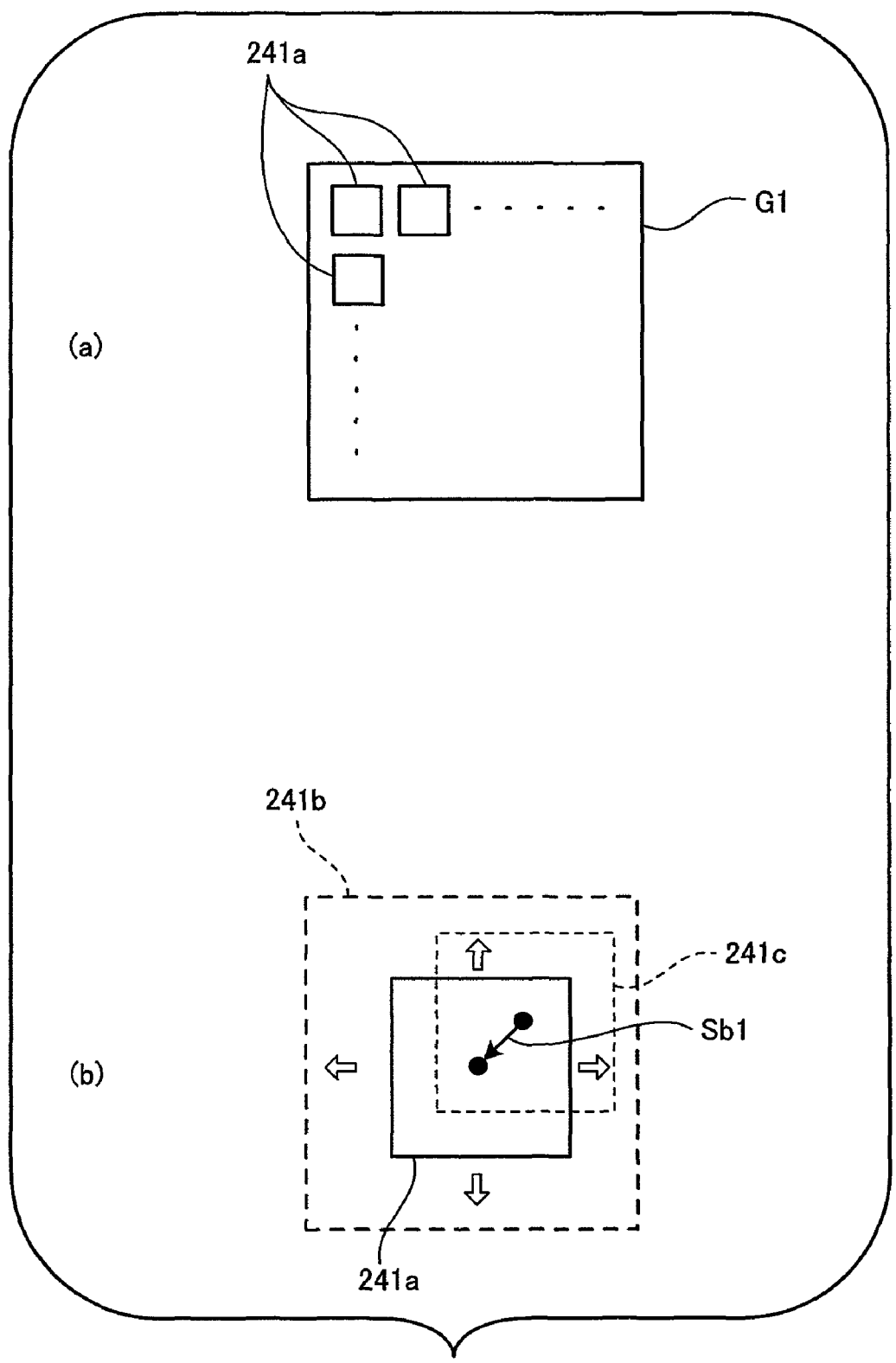
FIG. 9 is an explanatory drawing of calculation processing for calculating the first shift vector.

FIG. 9 is an explanatory drawing of calculation processing for calculating the first shift vector.

At first, in the first-shift-vector calculation section 241 as shown in Part (a) of FIG. 9, Regions Of Interest (ROI) in a square of 125 pixels×125 pixels are set at equal intervals in the first medical image G1. The ROI is hereinafter referred to as template 241a.

As shown in Part (b) of FIG. 9, a position corresponding to the center of each template 241a is set as a center, and a search range 241b in size of (125+A1) pixels×(125+A1) pixels is set in the second medical image G2a whose schematic alignment is completed.

Subsequently, in the search range 241b, a matching portion 241c that most agrees with the template 241a of the first medical image G1 is searched. This search starts from the center of the search range 241b and proceeds along a predetermined searching root. The matching here is represented by the sum total of pixel-value differentials between the image portions of the template 241a and the target for comparison. And then, in the search of the matching portion 241c, an image portion where the sum total of pixel-value differentials is minimized in the search range 241b is searched for as the matching portion 241c.

When the matching portion 241c is found as a result of this search, the first-shift-vector calculation section 241 calculates a vector that goes from the center of the matching portion 241c to the center of the search range 241b and determines the calculated vector as a first shift vector Sb1 for the template 241a. The first shift vector Sb1 indicates the direction and amount of a local transformation required to match the second medical image G2a whose schematic alignment is completed with the first medical image G1 for the template 241a.

The first shift vector calculation section 241 performs calculation of the first shift vector Sb1 for all the templates 241a in the first medical image G1.

In the first local-matching processing, when the calculations of the first shift vectors Sb1 are finished, the shift vector of each of pixels forming the second medical image G2a whose schematic alignment is completed is calculated based on an interpolation calculation (described later) in the first transformation section 242 of the first local-matching section 240 (step S112). Subsequently, based on the calculated shift vector of pixel, the second medical image G2a whose schematic alignment is completed is transformed by warping processing that will be described later (step S113).

Figure 10:
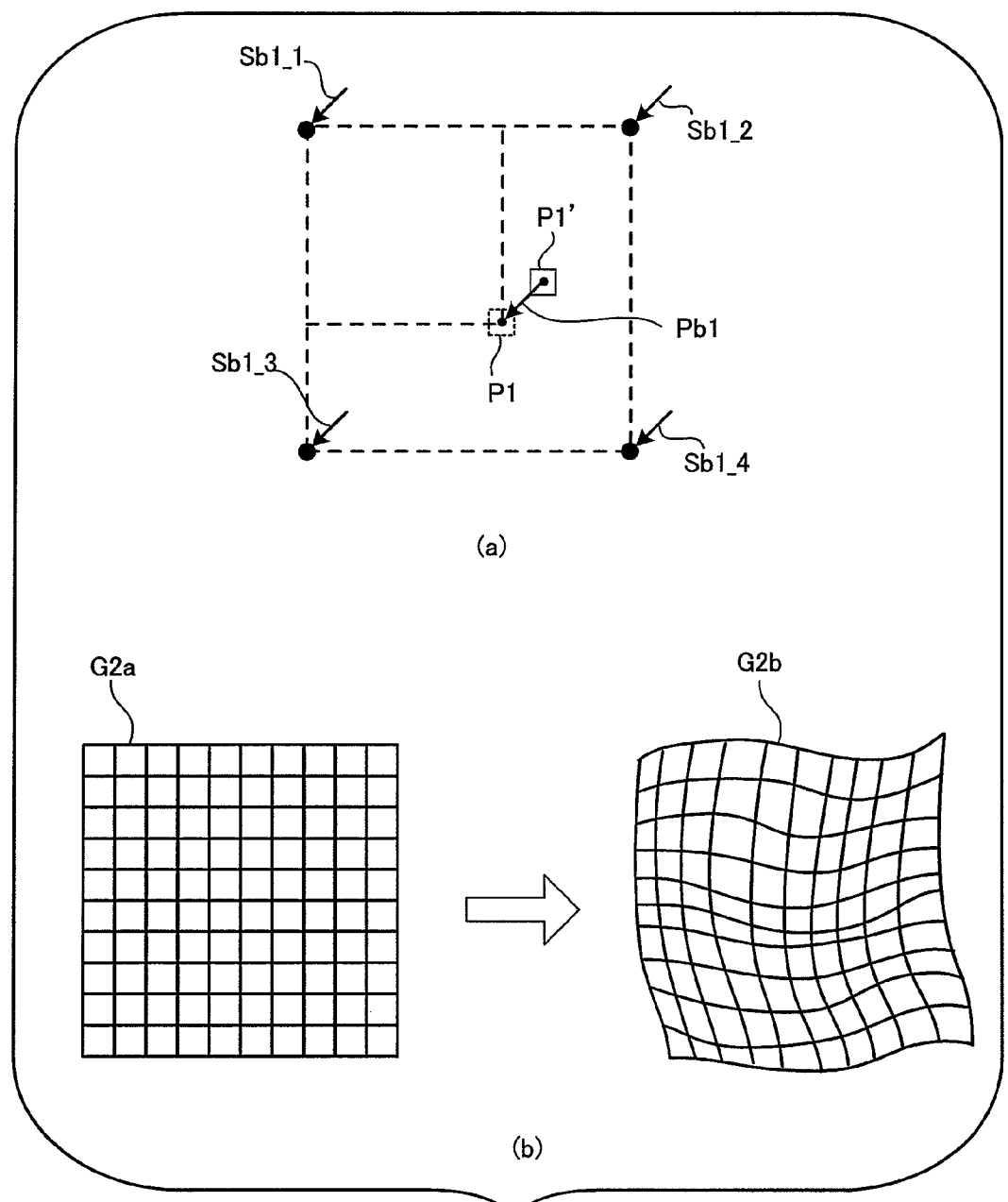
FIG. 10 is a typical illustration showing calculation processing for calculating the shift vector of a pixel and warping processing based on the shift vector of the pixel.

FIG. 10 is a typical illustration showing the calculation processing for calculating the pixel shift vector of the pixel and the warping processing based on the shift vector of the pixel.

The calculation processing for calculating the shift vector of a pixel by the interpolation calculation is shown in Part (a) of FIG. 10, while the warping processing is shown as in Part (b) of FIG. 10.

As shown in Part (a) of FIG. 10, in the present embodiment, based on a four-point interpolation calculation using four first vectors Sb1_1, Sb1_2, Sb1_3 and Sb1_4 obtained for four templates 241a, there is calculated a shift vector Pb1 of each pixel P1 in a square area surrounded by four points corresponding to the respective centers of the four templates 241a in the second medical image G2a whose schematic alignment is completed. The calculated shift vector Pb1 represents the direction and amount of movement required to move the pixel P1' corresponding to the starting point of the shift vector Pb1 to the position of the pixel P1 corresponding to the end point of the shift vector Pb1.

Here, there is a possibility that irregularities or mismatching have occurred in continuity between the shift vectors, because the shift vector of each pixel obtained by the four-point interpolation calculation includes the image state of the medical image, a search error in the calculation for searching for the matching portion, and a calculation error in the four-point interpolation calculation.

Therefore, when the shift vectors for all the pixels forming the second medical image G2a whose schematic alignment is completed are calculated in the calculation processing of calculating the shift vector of the pixel (step S112), subsequently in the warping processing (step S113), at first, the shift vectors of the respective pixels area aligned based on a correction using a technique of polynomial approximation.

In the warping processing (step S113), the pixel of the starting point of each shift vector is moved based on the shift vector after the correction. As a result, as shown in Part (b) of FIG. 10, the second medical image G2a is transformed to be smooth in its entirety, and the second medical image G2 which has been transformed to match with the first medical image G1 is obtained as a second medical image G2b.

Here, as mentioned above, the template 241a used to obtain the first shift vector Sb1 has the size of 125 pixels×125 pixels in the present embodiment. This is the size covering two ribs, which is suitable for, when a displacement between the first medical image G1 and the second medical image G2a after the schematic alignment exists due to, for example, the movements of ribs and the like accompanying the respiration of the subject, the search of the corresponding image portions G2b. Therefore, according to the first local-matching processing (S110) of the flowchart shown in FIG. 9, such a displacement of the image can be canceled. However, for example, the movement of the diaphragm is, even if it is a movement accompanying heartbeat or respiration, greatly different from the movement of ribs and the like. Therefore, there is a possibility that a displacement caused by the movement of the heartbeat or respiration will remain without being canceled in the first local-matching processing (S110). Thus, in the present embodiment, the displacement in image caused by the movements of the heartbeat and diaphragm are canceled in the second local-matching processing (S120) as described below.

In the second local-matching processing (S120), for the second medical image G2b which has been transformed in the first local-matching processing (S110), a second shift vector (described later) is calculated by the second-shift-vector calculation section 251 of the second local matching section 250 (step S121).

At first, in the second-shift-vector calculation section 251, the templates are arranged again in the first medical image G1 once again as follows.

Figure 11:
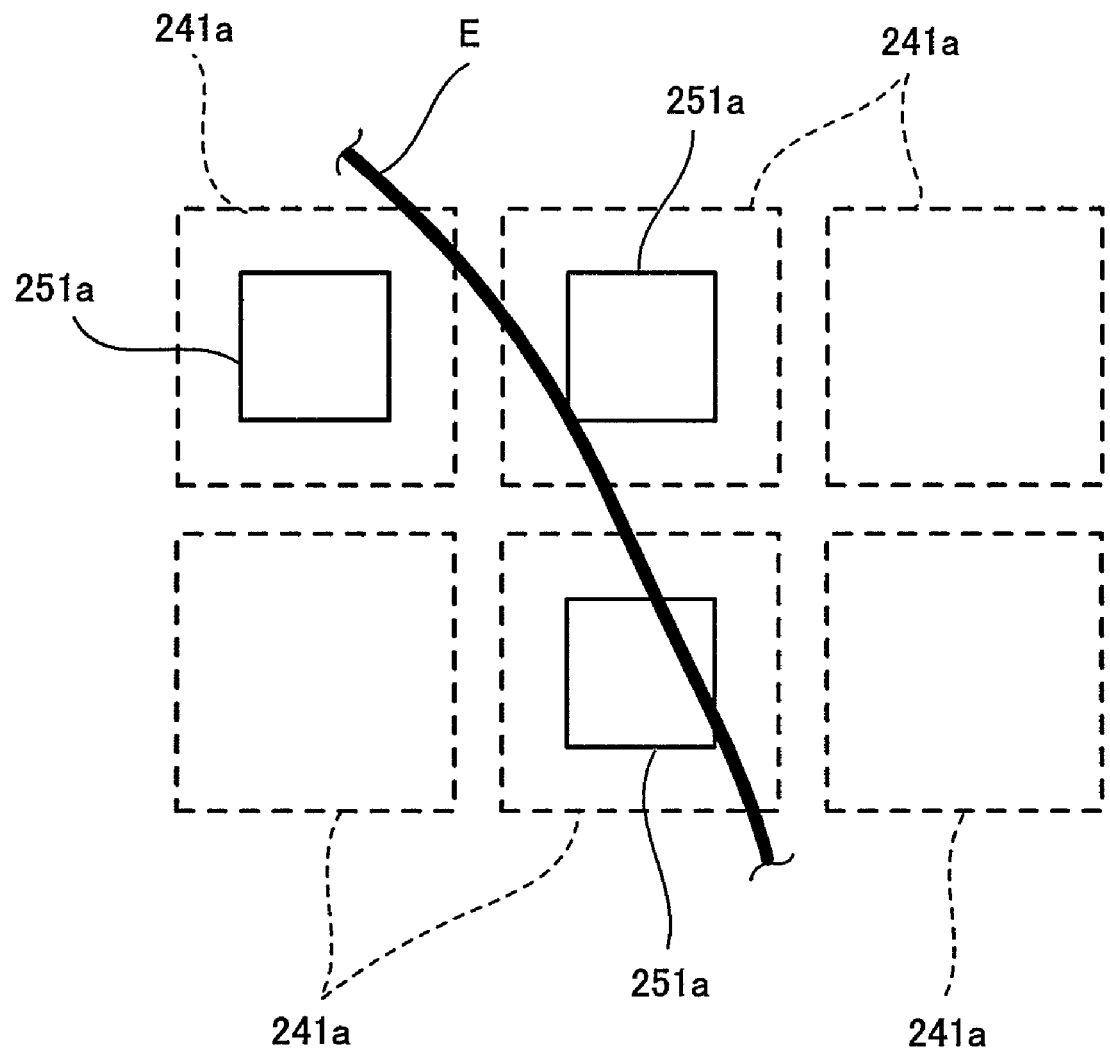
FIG. 11 is an explanatory drawing of an arrangement of a template by the second-shift-vector calculation section 251.

FIG. 11 is an explanatory drawing of the arrangement of templates by the second-shift-vector calculation section 251.

At first, in the second-shift-vector calculation section 251, the template 241 as of 125 pixels×125 pixels are arranged in the first medical image G1. Here, the portion where the heart edge E1 shown in FIG. 8 appears and the portion where the phrenic edges E2 appear have been conveyed to the second-shift-vector calculation section 251 from the edge identification section 220. The second-shift-vectorcal culation section 251 arranges small-sized templates 251a of 35 pixels×35 pixels in the first medical image G1 so that their centers coincide with those of the template 241 as including these edge-including portions (hereinafter merely referred to as "edge portion E"). As a result, the small templates 251a are arranged in the vicinity of the edge portion E.

Next, in the second-shift-vector calculation section 251, a matching portion is searched for about each of the small templates, the second shift vector that goes from the center of the matching portion found by the search to the center of a search range is obtained.

Figure 12:
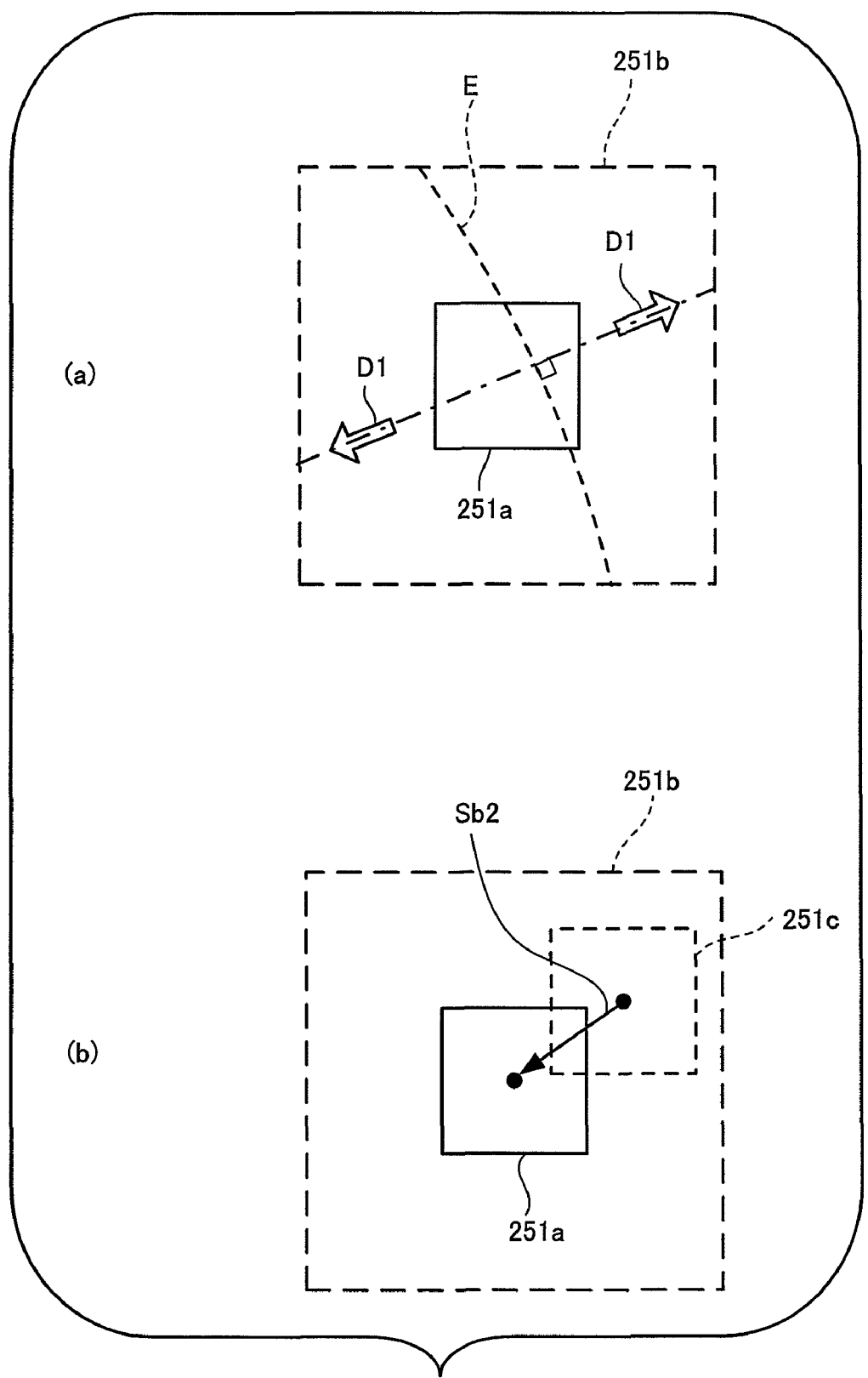
FIG. 12 is a diagram showing the search of a matching portion on a small template and the calculation of the second shift vector.

FIG. 12 is a diagram showing the search of the matching portion on the small template and the calculation of the second shift vector.

The searching direction for searching the matching portion is shown in Part (a) of FIG. 12 and an example of the second shift vector obtained as a result of the search is shown in Part (b) of FIG. 12.

To search for the matching portion, at first, a search range 251b of the size of pixels (35+A2)×pixels (35+A2) having each of the small template 251 at the center is set in the second medical image G2b which has been transformed. Here, the size of 35 pixels×35 pixels of the small template 251a is a size suitable for capturing the edge portion E locally, and the size of pixels (35+A2)×pixels (35+A2) set for the search range 251b is a size that falls in an anatomically predicted moving range of the edge of the heart or a moving range of the edge of the diaphragm.

When the search range 251b is set, a matching portion 251c that agrees with the small-sized template 251a of the first medical image G1 is searched for within the search range 251b. This search starts from the center of the search range 251b and goes along a direction D11 of the normal to the edge portion E in the first medical image G1. This means that the search of the matching portion 251c is performed along the moving direction of the predicted edge.

Subsequently, when the matching portion 251c is found, a second shift vector Sb2 that starts from the center of the matching portion 251c to the center of the search range 251b is obtained as shown in Part (b) of FIG. 12.

In the second-shift-vector calculation section 251, such a calculation of the second such shift vector Sb2 is performed for all of the small-sized templates 251a arranged in the vicinity of the edge portion E as described above. Further, in the second-shift-vector calculation section 251, the second shift vector Sb2 of a size of "zero" is set for the template 241a of 125 pixels×125 pixels excluding the edge portion E in the second medical image G2b which has been transformed.

In the second local-matching processing (step S120) shown in FIG. 7, when the second shift vector Sb2 is obtained for all the templates 241a and small-sized templates 251a, by using all these the second shift vector Sb2, the shift vectors of all pixels of the second medical image G2b which has been transformed are obtained in the second transformation section 252 of the second local matching section 250 (step S122) by means of a four-point interpolation calculation similar to that of the first local-matching processing (step S110). Subsequently, the calculated shift vector is subjected to a correction using the technique of polynomial approximation in a manner similar to the first local-matching processing (step S110), and based on the shift vector after the correction, the second medical image G2b which has been transformed is transformed by warping processing (step S123) similar to that of the first local-matching processing (step S110).

In the transformation performed in the second local-matching processing (step S120), because the size of the second shift vector Sb2 is set to "zero" at portions except for the vicinity of the edge portion E, the second medical image G2a is transformed locally for the portions in the vicinity of the edge portion E. In addition, because the transformation processing itself is performed over the entire second medical image G2a, the portions where the size of the second shift vector Sb2 is set to "zero" and the portions where the second shift vector Sb2 has some size in the vicinity of the edge portion E are smoothly connected.

By the second local-matching processing (step S120), the detail image matching is performed on the edge portion E, i.e., the portion at the edges of the heart and the diaphragm, and the image displacement due to the movement of the diaphragm caused by the heartbeat and respiration is canceled.

As described above, in the present embodiment, there is obtained the second medical image G2' which has been processed such that the image due to the movement of ribs and the like in the second medical image G2 with respect to the first medical image G1 is canceled by the first local-matching processing (step S110) and the image displacement due to the movement of the diaphragm caused by the heartbeat and respiration is canceled by the second local-matching processing (step S120). Accordingly, there are obtained two medical images matching each other with high accuracy, which are suitable for the ES processing to be performed in the ES processing device 50 shown in FIG. 3.

Figure 13:
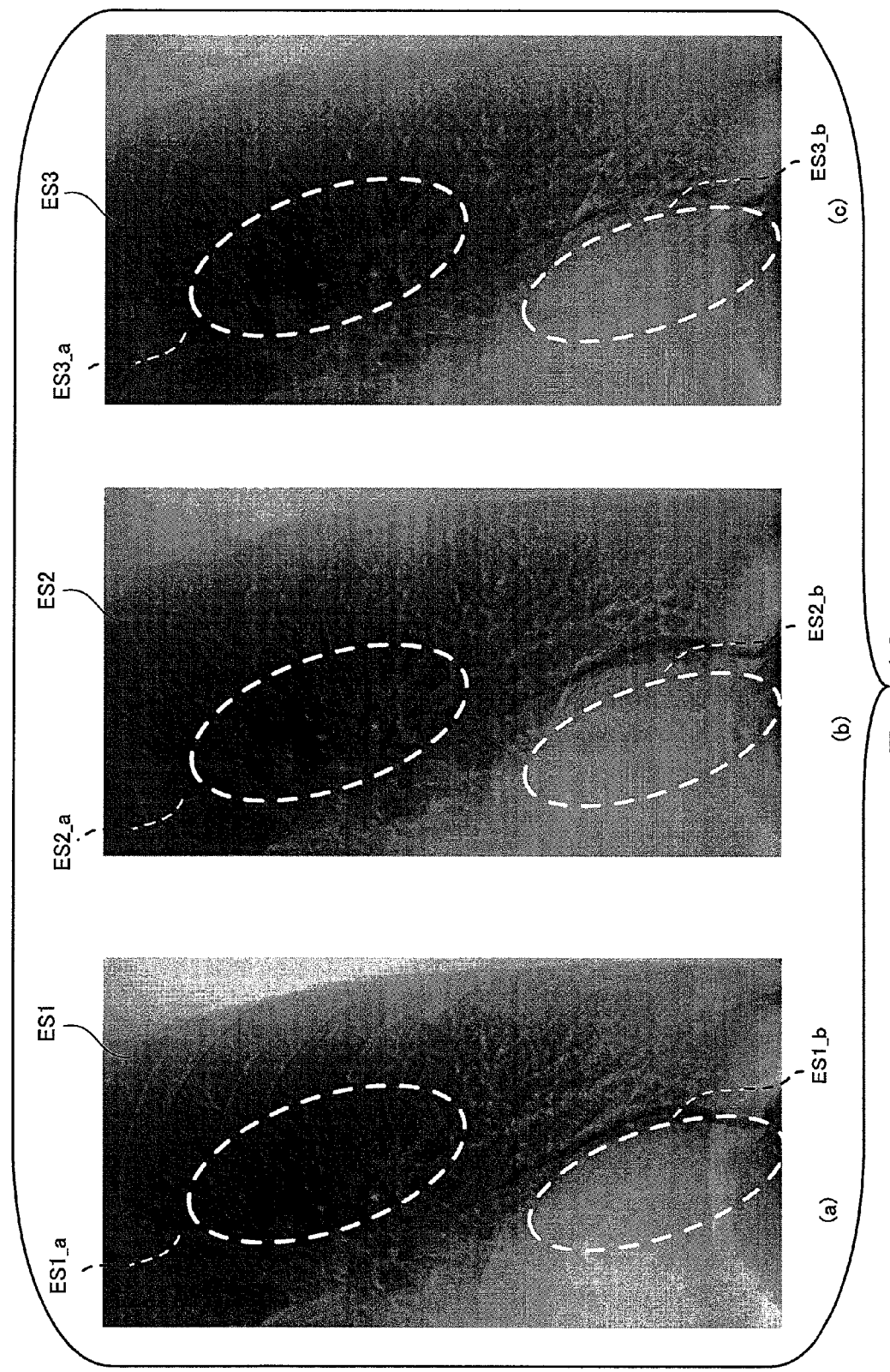
FIG. 13 is a diagram showing an example of an ES image obtained by the ES processing in the ES processing device 50 shown in FIG. 3.

FIG. 13 is a diagram showing an example of the ES image obtained by the ES processing performed in the ES processing device 50 shown in FIG. 3.

Part (a) of FIG. 13 shows a first soft-part ES image ES1 formed only by the image of soft tissues, which is obtained based on two medical images to be subjected to image processing in the image processing device 200 of the first type by erasing the image of bones therefrom. Part (b) of FIG. 13 shows a second soft-part ES image ES2 obtained based on then the two medical images at the stage where they have been subjected to the first local-matching processing (step S110). Part (c) of FIG. 13 shows a third soft-part ES image ES3 obtained based on the two medical images at the stage where they have been subjected to all the processing up to the second local-matching processing (step S120).

In the first soft-part ES image ES1 shown in Part (a) of FIG. 13, an artifact due to the image displacement resulting from the movement of ribs caused by the respiration is present in a lung part ES1_a. Further, an artifact due to the image displacement caused by the heartbeat is present in a border part ES1_b.

In the second soft-part ES image ES2 shown in Part (b) of FIG. 13, an artifact in a lung part ES2_a is canceled by the first local-matching processing (step S110), but an artifact in a border portion ES2_b between with the heart and the lungs is not canceled and remains.

In contrast, in the third soft-part ES image ES3 shown in Part (c) of FIG. 13, an artifact in a lung part ES3_a and an artifact in a border part ES3_b between the heart and the lungs are both canceled.

As described above, according to the image processing device 200 of the first type, which is the first embodiment of the present invention, two medical images can be matched with high accuracy so that they can be subjected to optimal ES processing.

Now, an image processing device of the second type which is the second embodiment of the present invention will be described.

The second embodiment of the present invention first performs the processing equivalent to the second local-matching processing performed in the first embodiment to cancel an image displacement due to the movement of a diaphragm caused by the heartbeat and respiration, and then performs the processing equivalent to the first local-matching processing performed by the first embodiment of the present invention to cancel an image displacement due to the movement of ribs and the like caused by the respiration. The second embodiment of the present invention is different from the first embodiment in this manner. Such a different feature of the second embodiment will be described below.

The image processing device of the second type is built in the medical-image display device 30 when the medical-image display device 30 shown in FIG. 1 operates according to an image processing program of the second type which will be described below. The image processing program of the second type is also an embodiment of the image processing program according to the present invention, and is supplied to the medical-image display device 30 through the CD-ROM 36 shown in FIG. 2.

Figure 14:
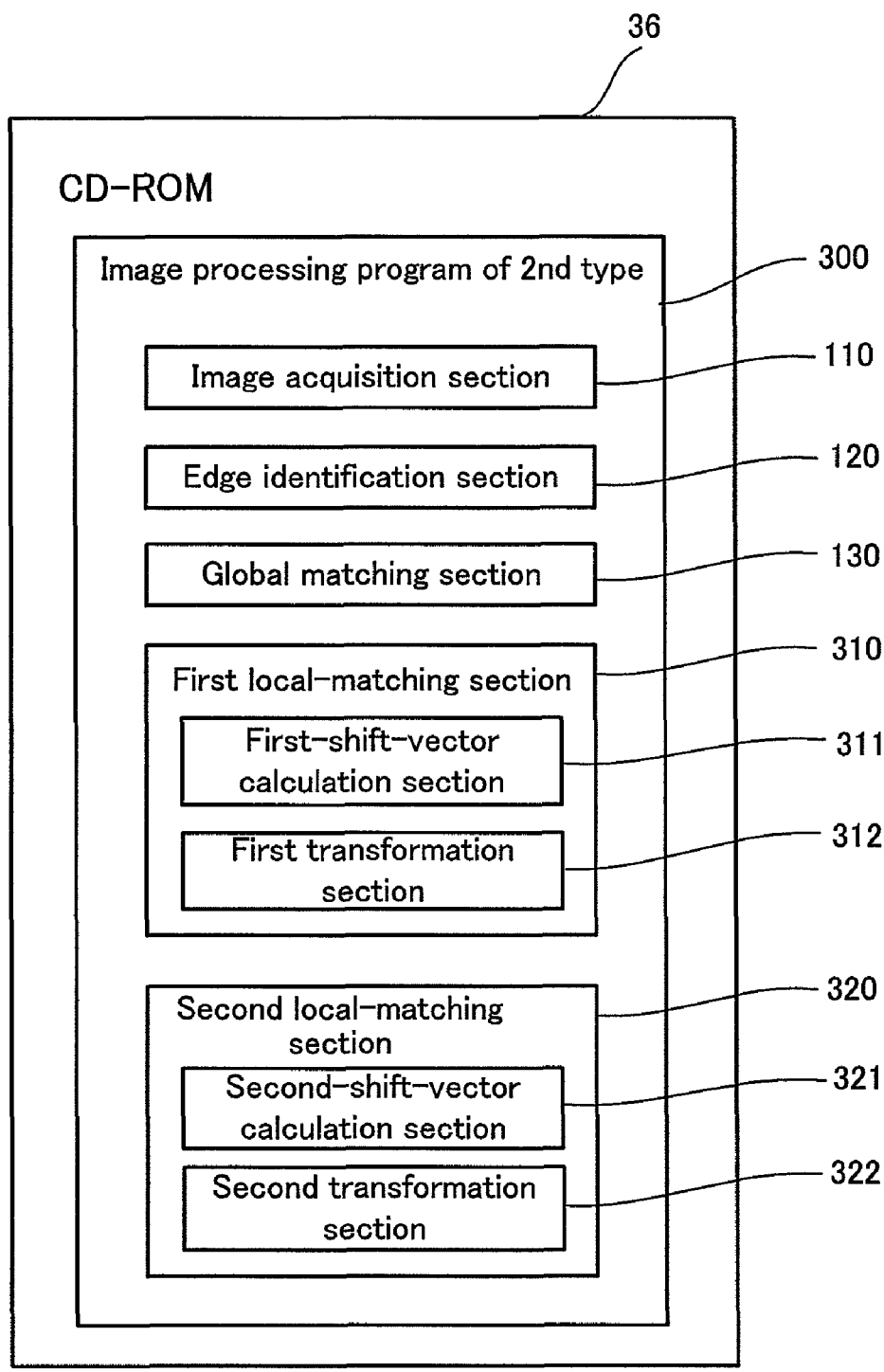
FIG. 14 is a conceptual diagram showing a CD-ROM 36 where an image processing program of the second type is stored.

FIG. 14 is a conceptual diagram showing the CD-ROM 36 where the image processing program of the second type is stored. Note that, in FIG. 14, the same elements as those of the image processing program 100 of the first type shown in FIG. 5 are assigned the same reference characters as those shown in FIG. 5.

As shown in FIG. 14, the image processing program 300 of the second type stored in the CD-ROM 36 is composed of an image acquisition section 110, an edge identification section 120, a global matching section 130, a first local-matching section 310 and a second local matching section 320. Further, the first local-matching section 310 is composed of constructed as a first-shift-vector calculation section 311 and a first transformation section 312, and the second local matching section 320 is composed of a second-shift-vector calculation section 321 and a second transformation section 322.

Each element of the image processing program 300 of the second type will be described in detail together with the operation of each element of the image processing device of the second type.

Figure 15:
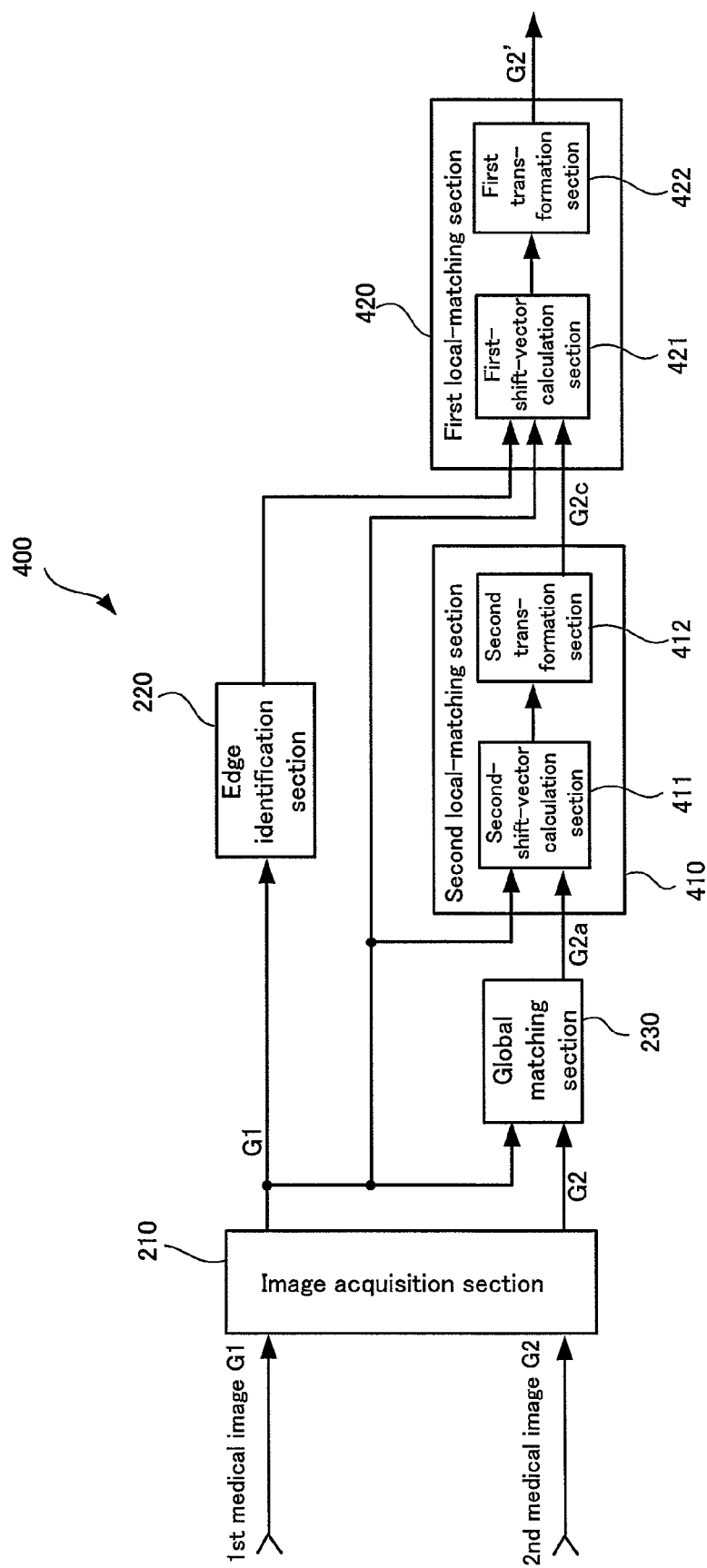
FIG. 15 is a functional block diagram of an image processing device of the second type.

FIG. 15 is a functional block diagram of the image processing device of the second type.

In FIG. 15, the elements equivalent to those of the image processing device 200 of the first type shown in FIG. 6 are assigned the same reference characters as those shown in FIG. 6, and these equivalent elements will not be described to avoid redundant description.

In the image processing device 400 of the second type shown in FIG. 15, a second medical image G2a whose schematic alignment is completed after the global matching processing by the global matching part 230 is first sent the second local matching section 410, which is equivalent to the second local-matching processing in the first embodiment, so as to cancel the image displacement due to the movement of the diaphragm caused by the heartbeat and respiration. The second local matching section 410 is an example of the second processing section according to the present invention.

Subsequently, in the second-shift-vector calculation section 411 of the second local matching section 410, a second shift vector for the vicinity of an edge portion E is obtained. And then, in the second transformation section 412, a local transformation is applied to the vicinity of the edge portion E in the second medical image G2a whose schematic alignment is completed. As a result, the image displacement due to the movement of the diaphragm caused by the heartbeat and respiration with respect to the first medical image G1 is canceled. After that, the second medical image G2c which has been transformed in the second local matching section 410 is sent to the first local matching section 420 that performs the processing equivalent to the first local-matching processing to cancel the image displacement due to the movement of ribs and the like caused by the respiration. The first local-matching section 420 is an example of the first processing section according to the present invention.

In the first-shift-vector calculation section 421 of the first local-matching section 420, the first shift vector is obtained for the entire second medical image G2c which has been transformed. Subsequently, transformation is performed on the entire second medical image G2c by the second transformation section 422. As a result, the image displacement due to the movement of ribs and the like caused by the respiration with respect to the first medical image G1 is canceled. Here, in the present embodiment, the portion matched with the first medical image G1 by the second local matching section 410 is slightly moved by the transformation performed by the first local-matching section 420. However, the amount of transformation to cancel the image displacement due to the movement of ribs and the like is relatively extremely small as compared to the amount of transformation to cancel the image displacement due to the movement of the diaphragm caused by the heartbeat and respiration. For this reason, the influence of the overall transformation by the first local-matching section 420 on the portion matched with the first medical image G1 by the second local matching section 410 is mostly ignored.

After the processing described above, the image processing device 400 of the second type can also perform image processing for matching two medical images with high accuracy to perform optimal ES processing, just like the image processing device 200 of the first type.

Now, an image processing device of the third type, which is the third embodiment of the present invention, will be described.

The third embodiment of the present invention is different from the first and the second embodiments in that the first and the second embodiments perform the transformation in two stages whereas the third embodiment performs the transformation only once. The following description will focus on such a different feature of the third embodiment.

The image processing device of the third type is built in the medical-image display device 30 when the medical-image display device 30 shown in FIG. 1 operates according to an image processing program of the third type, which will be described below, and is supplied to the medical-image display device 30 through the CD-ROM 36 shown in FIG. 2.

Figure 16:
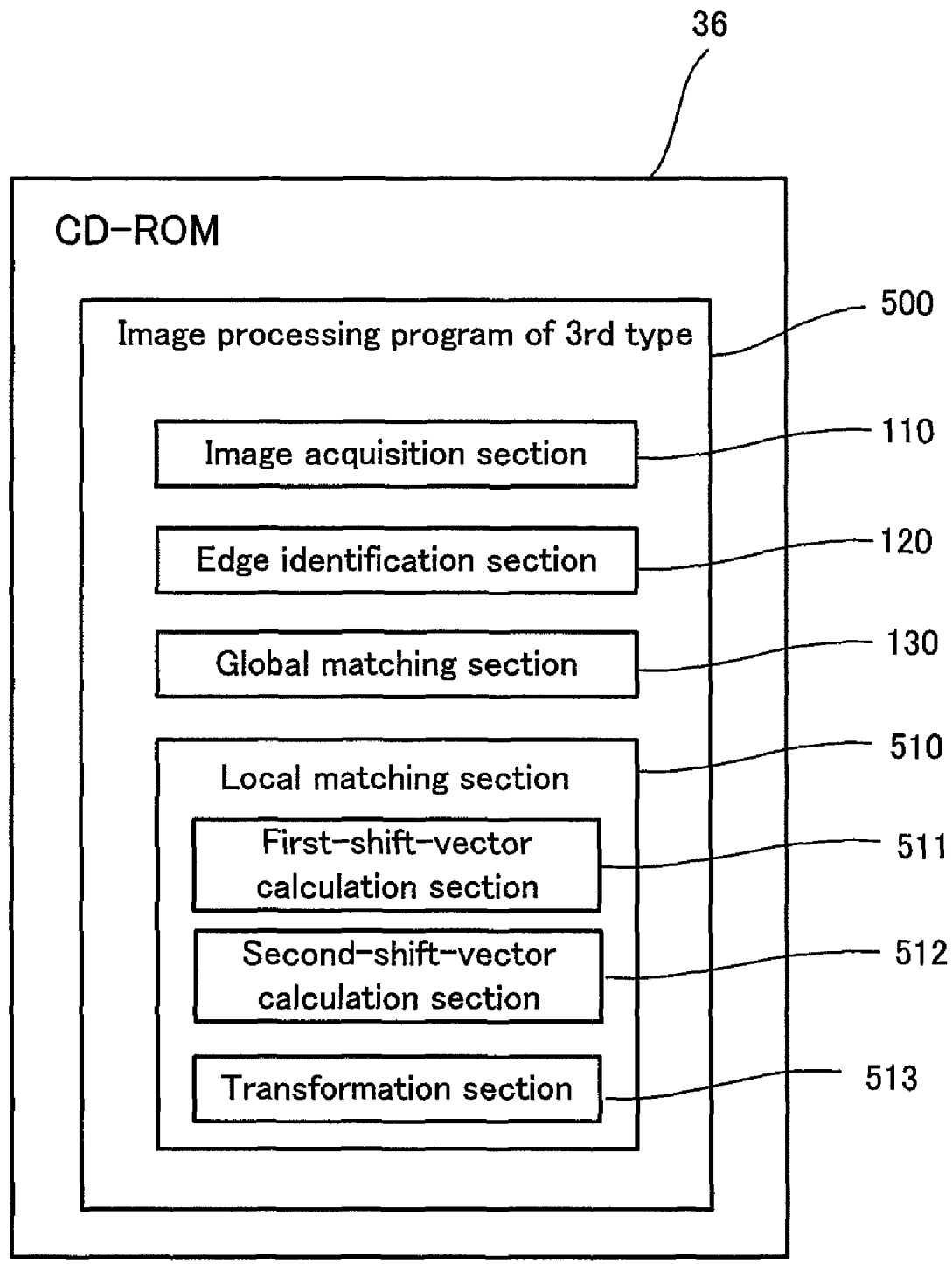
FIG. 16 is a conceptual diagram showing the CD-ROM 36 where an image processing program of the third type is stored.

FIG. 16 is a conceptual diagram showing the CD-ROM 36 where the image processing program of the third type is stored. Note that, in FIG. 16, the elements equivalent to those shown of the image processing program 100 of the first type shown in FIG. 5 will be assigned the same reference characters as those shown in FIG. 5.

As shown in FIG. 16, an image processing program 500 of the third type stored in the CD-ROM 36 is composed of an image acquisition section 110, an edge identification section 120, a global matching section 130 and a local matching section 510. Also, the local matching section 510 is composed of a first-shift-vector calculation section 511, a second-shift-vector calculation section 512 and a transformation section 513.

Each element of the image processing program 500 of the third type will be described in detail together with the operation of each element of the image processing device of the third type.

Figure 17:
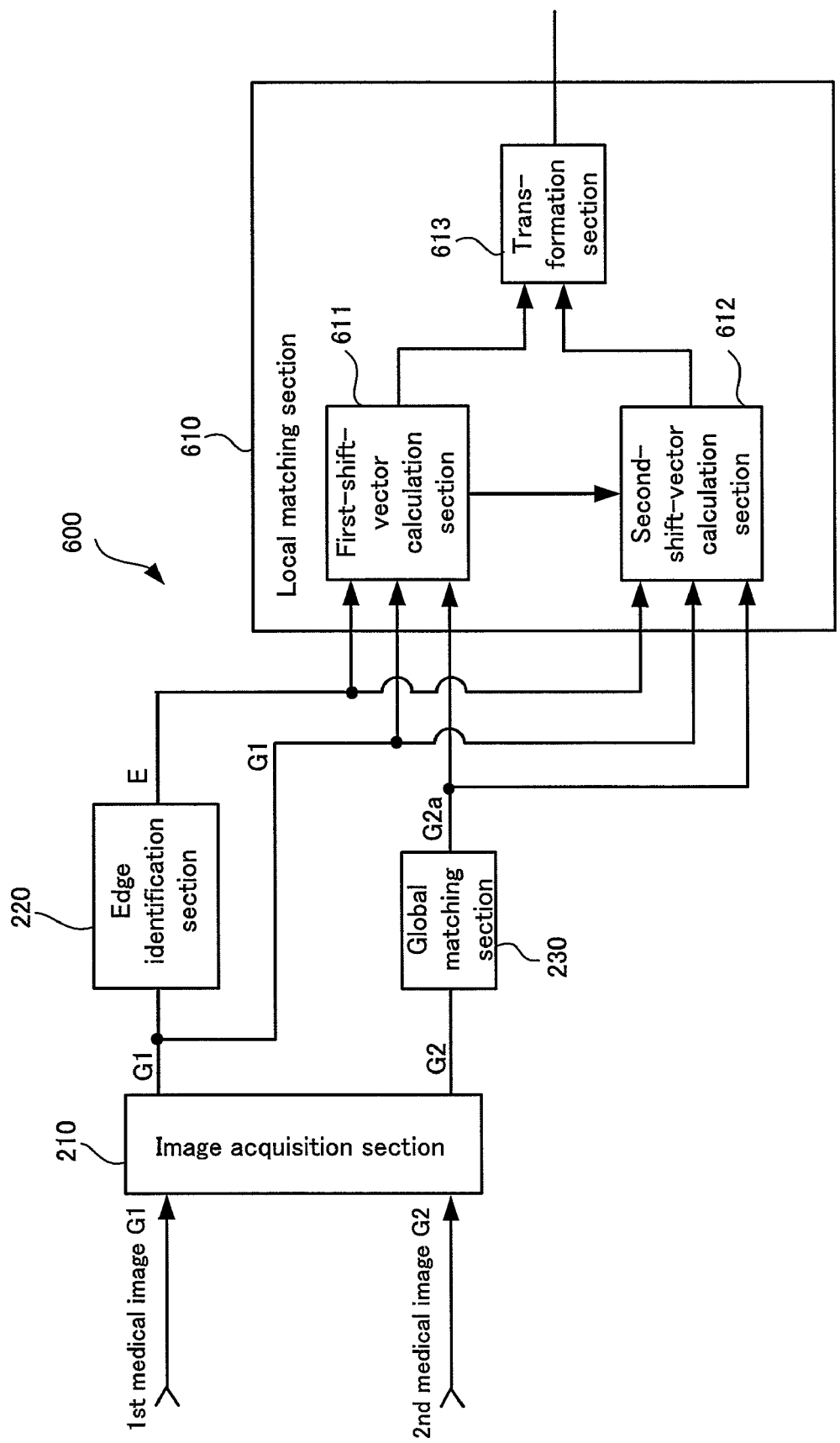
FIG. 17 is a functional block diagram of an image processing device of the third type.

FIG. 17 is a functional block diagram of the image processing device of the third type.

In FIG. 17, the elements equivalent to those of the image processing device 200 of the first type shown in FIG. 6 are assigned the same reference characters shown in FIG. 6 and thus will not be described to avoid redundant description.

In the image processing device 600 of the third type shown in FIG. 17, a second medical image G2a whose schematic alignment is completed after the global matching processing by the global matching part 230 is sent to both of the first-shift-vector calculation section 611 in the local matching section 610 and the second-shift-vector calculation section 612 in the local matching section 610. Also, to both of the first-shift-vector calculation section 611 and the second-shift-vector calculation section 612, a first medical image G1 is sent from the image acquisition section 210 and an edge portion E is sent from the edge identification section 220.

In each of the first-shift-vector calculation section 611 and the second-shift-vector calculation section 612, a shift vector is obtained as follows.

At first, in both of the first-shift-vector calculation section 611 and the second-shift-vector calculation section 612, templates are arranged in the first medical image G1 as follows.

Figure 18:
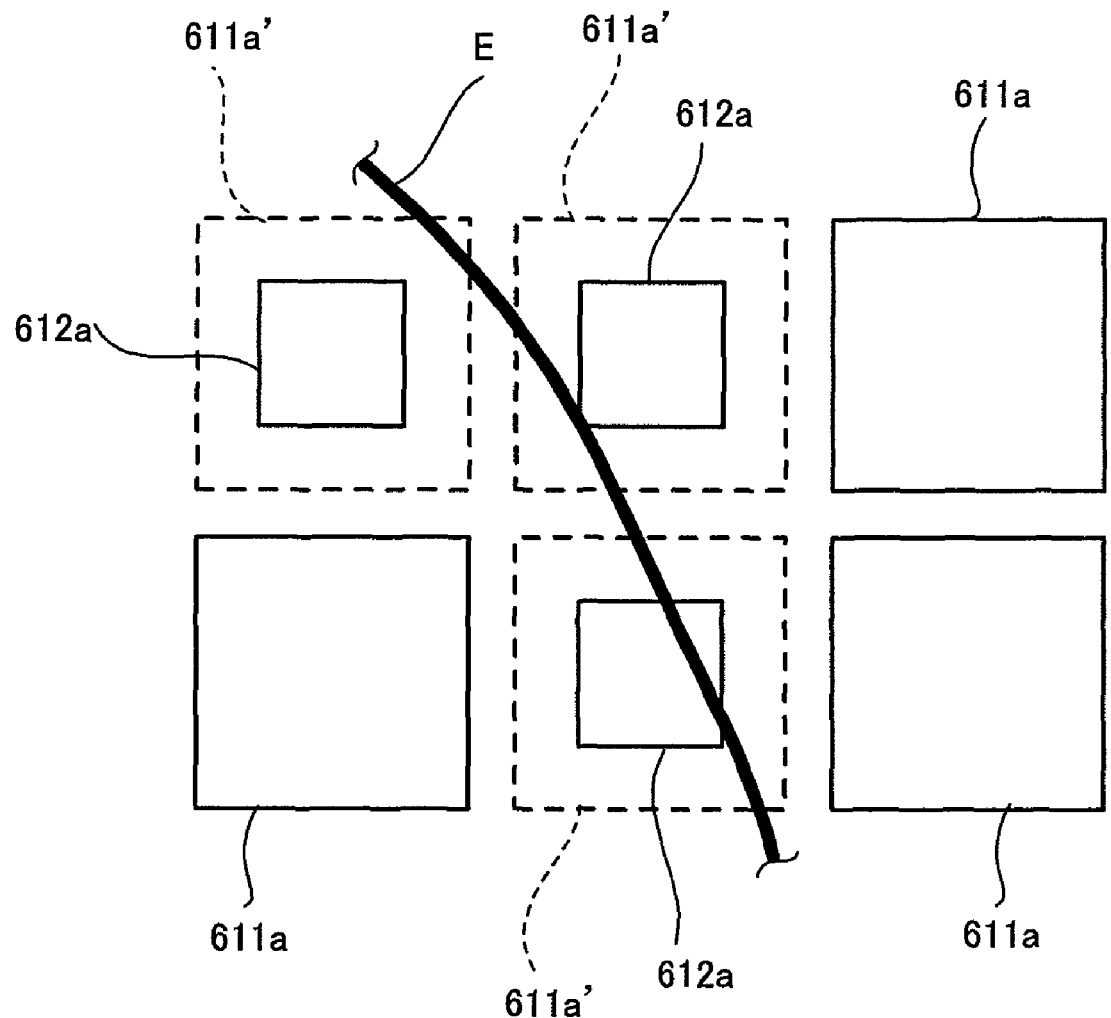
FIG. 18 is an explanatory drawing showing an arrangement of a template in both of the first-shift-vector calculation section 611 and the second-shift-vector calculation section 612.

FIG. 18 is an explanatory drawing showing the arrangement of the templates in both of the first-shift-vector calculation section 611 and the second-shift-vector calculation section 612.

At first, the first-shift-vector calculation section 611 arranges templates 611a of 125 pixels×125 pixels in the first medical image G1. But, the arrangement of templates 611a' overlapping the edge portion E sent from the edge identification section 220 is stopped, and this stoppage of arrangement is transmitted to the shift vector calculation section 612.

In the second-shift-vector calculation section 612, assuming that a virtual template is put in the position included in the transmitted stoppage of the template arrangement, a small-sized template 612a of 35 pixels×35 pixels is placed on that position by aligning the center of the virtual template with the center of the small-sized template 612a.

Subsequently, the first-shift-vector calculation section 611 and the second-shift-vector calculation section 612 calculates the first shift vector on each of the templates 611a and the second shift vector on each of the small-sized templates 612a, respectively, by the processing equivalent to the proceeding performed in the first embodiment.

When the calculation of each shift vector is finished, the transformation section 613 calculates the shift vector of each of pixels forming the second medical image G2a whose schematic alignment is completed, and then executes transformation processing based on the calculated shift vector.

Figure 19:
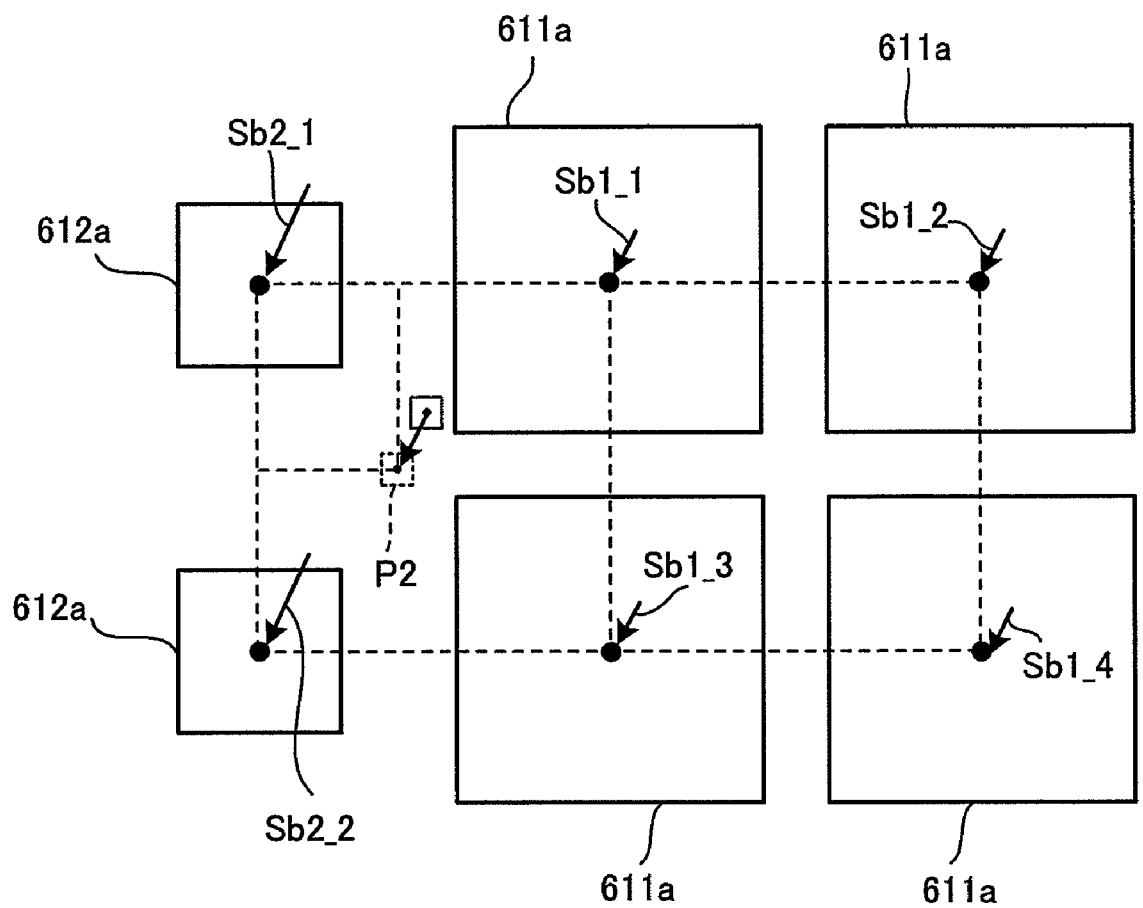
FIG. 19 is a diagram showing calculation processing of the shift vector of a pixel.

FIG. 19 is a diagram showing the calculation processing of the shift vector of the pixel.

FIG. 19 shows four first shift vectors Sb1_1, Sb1_2, Sb1_3 and Sb1_4 on the templates 611a and two second shift vectors Sb2_1 and Sb2_2 on the small templates 612a. In the transformation section 613, the shift vectors of pixels are calculated by the four-point interpolation calculation in a manner similar to the calculation of the shift vector of the pixel in the first and the second embodiments. Note that, in the present embodiment, for example, as for a pixel P2 in a range surrounded by two kinds of shift vectors, which are the first shift vector and the second shift vector as shown in FIG. 19, a shift vector is obtained by the four-point interpolation calculation using these two kinds of shift vectors (the first shift vectors Sb1_1 and Sb1_3 and the second shift vectors Sb2_1 and Sb2_2 in the example shown in FIG. 19).

After the shift vector of each pixel in the second medical image G2a whose schematic alignment is completed is calculated in this way, a correction using the technique of polynomial approximation is applied to the calculated shift vector of the pixel in the transformation section 613, and based on the corrected shift vector, the entire second medical image G2a is transformed only once. By this transformation, the image displacement, with respect to the first medical image G1, due to the movement of the diaphragm caused by the heartbeat and respiration in the vicinity of the edge portion E in the second medical image G2a whose schematic alignment is completed and the image displacement due to the movement of ribs and the like are canceled at the same time.

The combination of the first-shift-vector calculation section 611 and the transformation section 613 is an example of the first processing section according to the present invention, and the combination of the transformation section 613 and the second-shift-vector calculation section 612 is an example of the second processing section according to the present invention.

After going through the processing described above, the image processing device 600 of the third type can also perform the image processing for matching two medical images with high accuracy so that they are subjected to optimal ES processing, just like the image processing devices 200 and 400 of the first and second types.

In the above description, the image processing devices which transform only one of the two medical images to match the one to the other have been each employed as an embodiment of the image processing device of the present invention, but the present invention is not limited thereto. The image processing device of the present invention may be, for example, a device which transforms both two medical images and cause them to match each other.

Further, in the above description, the image processing devices, which match two medical images to be subjected to ES processing, have been each employed as one embodiment of the image processing device of the present invention. However, the present invention is not limited thereto. The present invention may be, for example, a device which matches two medical images to be subjected to the so-called temporal subtraction processing for extracting the generation of a lesion or changes over time.

Furthermore, in the above description, the image processing devices provided with the global matching section that performs schematic matching by moving or inclining the image have been each employed as an embodiment of the image processing device of the present invention, but the present invention is not limited thereto. The present invention may be a device having a global matching section that performs schematic matching by linearly transforming the image.

Still furthermore, as an example of the part identification section according to the present invention, the edge identification section that identifies the edges of a heart and a diaphragm has been described above, but the present invention is not limited to thereto. The part identification section of the present invention may be a section that identifies the edge of other organ such as a stomach and a liver or identifies an area occupied by such an organ in the image.

What is claimed is:

1. An image processing device comprising:
   an image receiving means for receiving a first photographic image and a second photographic image of a same examination object, the first and second photographic images being imaged at imaging times different from each other;
   an edge identification means for identifying an edge of a predetermined part among parts that form the subject in the first photographic image;
   a first processing means for (1a) determining a plurality of first reference image portions in the first photographic image each of which is composed of a first same number of pixels and has a same first predetermined shape, (1b) determining a plurality of first search ranges in the second photographic image each of which is composed of more than the first same number of pixels, and which have respectively centers at a plurality of positions in the second photographic image corresponding to positions of centers of the same first predetermined shapes of the plurality of first reference image portions respectively, (1c) obtaining two or more first comparison image portions in each of the plurality of first search ranges each first comparison image portion of which is composed of a same number of pixels as the first same number of pixels in each of the plurality of first reference image portions and has the same first predetermined shape, (1d) comparing pixel values of pixels in each of the two or more first comparison image portions in the each of the plurality of first search ranges, with pixel values of pixels in one of the plurality of first reference image portions that has a center at a position in the first photographic image corresponding to a position of a center of the each of the plurality of first search ranges, (1e) determining, as a first matching image portion, one of the two or more first comparison image portions which gives the best agreement with the one of the plurality of first reference image portions, of the two or more first comparison image portions, (1f) obtaining a first vector which connects a center of the first matching image portion and the center of the each of the plurality of first search ranges, and (1g) performing a first matching processing on the second photographic image to match the second photographic image with the first photographic image by locally deforming the second photographic image by amounts of local deformation along local deformation directions each of which is calculated by using the obtained first vector; and
   a second processing means for means for (2a-1) obtaining one or more first reference image portions through which the edge identified by the edge identification means passes, of the plurality of first reference image portions, (2a-2) determining one or more second reference image portions in the first photographic image each of which is composed of a second same number of pixels and has a same second predetermined shape, the second same number of pixels being less than the first same number of pixels and the one or more second reference image portions having centers at same positions as positions of centers of the one or more first reference image portions respectively, (2b) determining one or more second search ranges in the second photographic image each of which is composed of more than the second same number of pixels, and which have respectively centers at one or more positions in the second photographic image corresponding to positions of centers of the same second predetermined shapes of the one or more second reference image portions respectively, (2c) obtaining two or more second comparison image portions in each of the one or more second search ranges each second comparison image portion of which is composed of a same number of pixels as the second same number of pixels in each of the one or more second reference image portions and has the same second predetermined shape, (2d) comparing pixel values of pixels in each of the two or more second comparison image portions in the each of the one or more second search ranges, with pixel values of pixels in one of the one or more second reference image portions that has a center at a position in the first photographic image corresponding to a position of a center of the each of the one or more second search ranges, (2e) determining, as a second matching image portion, one of the two or more second comparison image portions which gave the best agreement with the one of the one or more second reference image portions, of the two or more second comparison image portions, (2f) obtaining a second vector which connects a center of the second matching image portion and the center of the each of the one or more second search ranges, and (2g) performing a second matching processing on the second photographic image to match the second photographic image with the first photographic image by locally deforming the second photographic image by amounts of local deformation along local deformation directions each of which is calculated by using the obtained second vector.

2. The image processing device according to claim 1, wherein the first processing means performs the first matching processing on portions which do not include the edge, of all portions which constitutes the second photographic image, while avoiding performing the first matching processing on portions which include the edge, of the all portions.

3. The image processing device according to claim 2, wherein the first processing means and the second processing means perform the first matching processing and the second matching processing in parallel.

4. The image processing device according to claim 1, wherein the second processing means performs the second matching processing on the second photographic image after the first matching processing is performed on the second photographic image by the first processing means.

5. The image processing device according to claim 1, wherein the second processing means performs the second matching processing on the second photographic image before the first matching processing is performed on the second photographic image by the first processing means.

6. An non-transitory computer-readable medium which stores an image processing program that is incorporated and implements in a computer:
   an image receiving section that receives a first photographic image and a second photographic image of a same examination object, the first and second photographic images being imaged at imaging times different from each other;
   an edge identification section that identifies an edge of a predetermined part among parts that form the subject in the first photographic image;
   a first processing means for (1a) determining a plurality of first reference image portions in the first photographic image each of which is composed of a first same number of pixels and has a same first predetermined shape, (1b) determining a plurality of first search ranges in the second photographic image each of which is composed of more than the first same number of pixels, and which have respectively centers at a plurality of positions in the second photographic image corresponding to positions of centers of the same first predetermined shapes of the plurality of first reference image portions respectively, (1c) obtaining two or more first comparison image portions in each of the plurality of first search ranges each first comparison image portion of which is composed of a same number of pixels as the first same number of pixels in each of the plurality of first reference image portions and has the same first predetermined shape, (1d) comparing pixel values of pixels in each of the two or more first comparison image portions in the each of the plurality of first search ranges, with pixel values of pixels in one of the plurality of first reference image portions that has a center at a position in the first photographic image corresponding to a position of a center of the each of the plurality of first search ranges, (1e) determining, as a first matching image portion, one of the two or more first comparison image portions which gives the best agreement with the one of the plurality of first reference image portions, of the two or more first comparison image portions, (1f) obtaining a first vector which connects a center of the first matching image portion and the center of the each of the plurality of first search ranges, and (1g) performing a first matching processing on the second photographic image to match the second photographic image with the first photographic image by locally deforming the second photographic image by amounts of local deformation along local deformation directions each of which is calculated by using the obtained first vector; and
   a second processing means for means for (2a-1) obtaining one or more first reference image portions through which the edge identified by the edge identification means passes, of the plurality of first reference image portions, (2a-2) determining one or more second reference image portions in the first photographic image each of which is composed of a second same number of pixels and has a same second predetermined shape, the second same number of pixels being less than the first same number of pixels and the one or more second reference image portions having centers at same positions as positions of centers of the one or more first reference image portions respectively, (2b) determining one or more second search ranges in the second photographic image each of which is composed of more than the second same number of pixels, and which have respectively centers at one or more positions in the second photographic image corresponding to positions of centers of the same second predetermined shapes of the one or more second reference image portions respectively, (2c) obtaining two or more second comparison image portions in each of the one or more second search ranges each second comparison image portion of which is composed of a same number of pixels as the second same number of pixels in each of the one or more second reference image portions and has the same second predetermined shape, (2d) comparing pixel values of pixels in each of the two or more second comparison image portions in the each of the one or more second search ranges, with pixel values of pixels in one of the one or more second reference image portions that has a center at a position in the first photographic image corresponding to a position of a center of the each of the one or more second search ranges, (2e) determining, as a second matching image portion, one of the two or more second comparison image portions which gave the best agreement with the one of the one or more second reference image portions, of the two or more second comparison image portions, (2f) obtaining a second vector which connects a center of the second matching image portion and the center of the each of the one or more second search ranges, and (2g) performing a second matching processing on the second photographic image to match the second photographic image with the first photographic image by locally deforming the second photographic image by amounts of local deformation along local deformation directions each of which is calculated by using the obtained second vector.

* * * * *